(12) United States Patent
Okude et al.

(10) Patent No.: US 9,948,853 B2
(45) Date of Patent: Apr. 17, 2018

(54) CAMERA PARAMETER CALCULATION DEVICE, NAVIGATION SYSTEM AND CAMERA PARAMETER CALCULATION METHOD

(71) Applicant: Clarion Co., Ltd., Saitama-shi, Saitama (JP)

(72) Inventors: Mariko Okude, Tokyo (JP); Tomoaki Hiruta, Tokyo (JP); Shinichi Amaya, Saitama (JP); Takeshi Shima, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 96 days.

(21) Appl. No.: 14/419,369

(22) PCT Filed: Aug. 1, 2013

(86) PCT No.: PCT/JP2013/070880
§ 371 (c)(1),
(2) Date: Feb. 3, 2015

(87) PCT Pub. No.: WO2014/021421
PCT Pub. Date: Feb. 6, 2014

(65) Prior Publication Data
US 2015/0222813 A1 Aug. 6, 2015

(30) Foreign Application Priority Data
Aug. 3, 2012 (JP) .................. 2012-172930

(51) Int. Cl.
*H04N 5/232* (2006.01)
*G01C 21/36* (2006.01)
(Continued)

(52) U.S. Cl.
CPC ......... *H04N 5/23216* (2013.01); *G01C 21/20* (2013.01); *G01C 21/3602* (2013.01);
(Continued)

(58) Field of Classification Search
None
See application file for complete search history.

(56) References Cited

U.S. PATENT DOCUMENTS 5,801,970 A * 9/1998 Rowland ............... G06T 7/2046
342/63
6,133,947 A 10/2000 Mikuni
(Continued)

FOREIGN PATENT DOCUMENTS

CN 101435706 A 5/2009
CN 101608923 A 12/2009
(Continued)

OTHER PUBLICATIONS

Sone, Hisao; Machine translation of JP 2009260475 A; Nov. 2009.*
(Continued)

*Primary Examiner* — John Olszewski
*Assistant Examiner* — David P. Merlino
(74) *Attorney, Agent, or Firm* — Crowell & Moring LLP

(57) ABSTRACT

A device for calculating one or more camera parameters of a camera mounted on a traveling vehicle includes a location information acquisition unit, a road width information acquisition unit, a scenery image acquisition unit, and a camera parameter calibration unit. The device calculates a height of a mount position of the camera and a direction of the camera. The device also converts a scenery image captured by the camera of a scenery including the road on which the traveling vehicle moves into an image that is displayed for navigation.

10 Claims, 16 Drawing Sheets

(51) Int. Cl.
*G09B 29/00* (2006.01)
*G09B 29/10* (2006.01)
*G01C 21/20* (2006.01)
*G06T 7/80* (2017.01)

(52) U.S. Cl.
CPC ............ *G01C 21/3658* (2013.01); *G06T 7/80* (2017.01); *G09B 29/00* (2013.01); *G09B 29/10* (2013.01); *G06T 2207/30252* (2013.01); *G06T 2207/30256* (2013.01)

(56) References Cited

U.S. PATENT DOCUMENTS

| | | |
|---|---|---|
| 6,285,317 B1 | 9/2001 | Ong |
| 2008/0007619 A1* | 1/2008 | Shima ................ G06T 7/80 348/118 |
| 2008/0240616 A1 | 10/2008 | Haering et al. |
| 2009/0290032 A1* | 11/2009 | Zhang ................ G06T 7/80 348/211.9 |
| 2009/0299626 A1 | 12/2009 | Denaro |
| 2010/0131197 A1 | 5/2010 | Zhang et al. |
| 2010/0321490 A1 | 12/2010 | Chen et al. |
| 2011/0115912 A1* | 5/2011 | Kuehnle ............. G06T 7/80 348/148 |
| 2011/0205365 A1 | 8/2011 | Kurosu et al. |
| 2011/0228078 A1* | 9/2011 | Chen ................ G01C 21/3647 348/113 |
| 2011/0228101 A1 | 9/2011 | Miksch |
| 2013/0002871 A1* | 1/2013 | Natroshvili .......... G06T 7/0018 348/148 |
| 2017/0327128 A1* | 11/2017 | Denaro ............. B60W 50/14 |

FOREIGN PATENT DOCUMENTS

| | | |
|---|---|---|
| CN | 102197276 A | 9/2011 |
| EP | 1 914 682 A1 | 4/2008 |
| EP | 2 405 399 A1 | 1/2012 |
| JP | 7-63572 A | 3/1995 |
| JP | 7-141486 A | 6/1995 |
| JP | H09-48298 * | 2/1997 |
| JP | 2002-259995 A | 9/2002 |
| JP | 2007-34989 A | 2/2007 |
| JP | 2008-11174 A | 1/2008 |
| JP | 2009260475 A * | 11/2009 |
| WO | WO 2009/142921 A2 | 11/2009 |

OTHER PUBLICATIONS

Fukushima, Machine translation of JP H09-48298, Feb. 1997, espacenet.com.*
European Search Report issued in counterpart European Application No. 13825335.6 dated Apr. 4, 2016 (eight (8) pages).
Chinese Office Acton issued in counterpart Chinese Application No. 201380041261.1 dated Jun. 29, 2016 with machine translation (nine pages).
International Search Report dated Aug. 27, 2013 with English translation (four (4) pages).
Extended European Search Report issued in counterpart European Application No. 13825335.6 dated Sep. 12, 2016 (sixteen (16) pages).

* cited by examiner

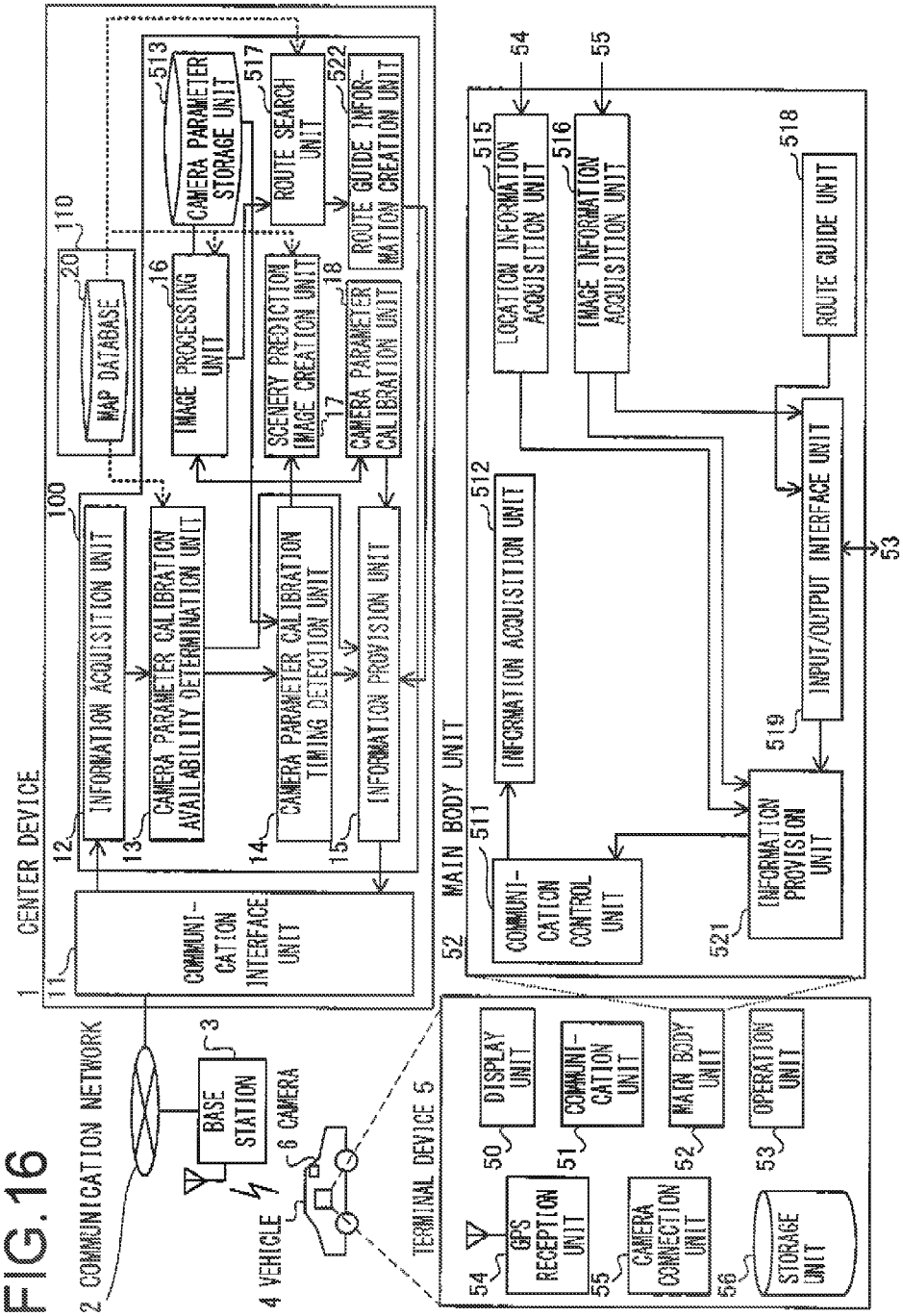

CAMERA PARAMETER CALCULATION DEVICE, NAVIGATION SYSTEM AND CAMERA PARAMETER CALCULATION METHOD

TECHNICAL FIELD

The present invention relates to a camera parameter calculation device, a navigation system, and a camera parameter calculation method.

BACKGROUND ART

The background art of this technical field includes the technology disclosed in Patent literature 1. Patent literature 1 discloses a calibration device for a camera mounted on a vehicle that allows frequent correction of the optical axis of such an on-vehicle camera while the vehicle is running.

CITATION LIST

Patent Literature

Patent literature 1: Patent literature 1: Japanese Laid Open Patent Publication No. 2008-11174

SUMMARY OF INVENTION

Technical Problem

The calibration device for an on-vehicle camera disclosed in Patent literature 1 performs calibration of camera parameters when the on-vehicle camera shoots any marking on the surface of a road, needing information on markings on road surfaces of roads included in map data in advance. This increases the size of map data than conventionally.

It is an object of the present invention to provide a device and a method for calculating camera parameters for navigation that perform the calibration of camera parameters using conventional map data as is.

Solution to Problem

According to the first aspect of the present invention, a device for calculating one or more camera parameters of a camera mounted on a moving body for converting a scenery image captured by the camera of a scenery including a road on which the moving body moves into an image for navigation, the one or more camera parameters representing a height of a mount position of the camera and a direction of the camera comprises: a location information acquisition unit that acquires location information about a current location of the moving body; a road width information acquisition unit that acquires road data corresponding to the current location based on the location information and acquires road width information relating to a width of the road on which the moving body moves at the current location from the road data; a scenery image acquisition unit that acquires the scenery image from the camera; and a camera parameter calibration unit that performs calibration calculation of the camera parameters based on the scenery image and the road width information.

According to the second aspect of the present invention, a method of calculating one or more camera parameters in a device for calculating one or more camera parameters of a camera mounted on a moving body for converting a scenery image captured by the camera of a scenery including a road on which the moving body moves into an image for navigation, the one or more camera parameters representing a height of a mount position of the camera and a direction of the camera comprises: acquiring location information about a current location of the moving body; acquiring road data corresponding to the current location based on the location information; acquiring road width information about a road width of a road on which the moving body moves at the current location; acquiring the scenery image from the camera; and executing calibration calculation of the camera parameters based on the scenery image and the road width information.

Advantageous Effects of Invention

According to the present invention, a device and a method for calculating camera parameters for navigation can be provided which performs calculations for the calibration of camera parameters to convert images into those for use in navigation using conventional map data as is.

BRIEF DESCRIPTION OF DRAWINGS

FIG. 16 is a block diagram showing the whole configuration of the navigation system.

DESCRIPTION OF EMBODIMENTS

First Embodiment

A first embodiment of the present invention is now described in detail referring to the attached drawings.

(Whole Construction)

Figure 1:
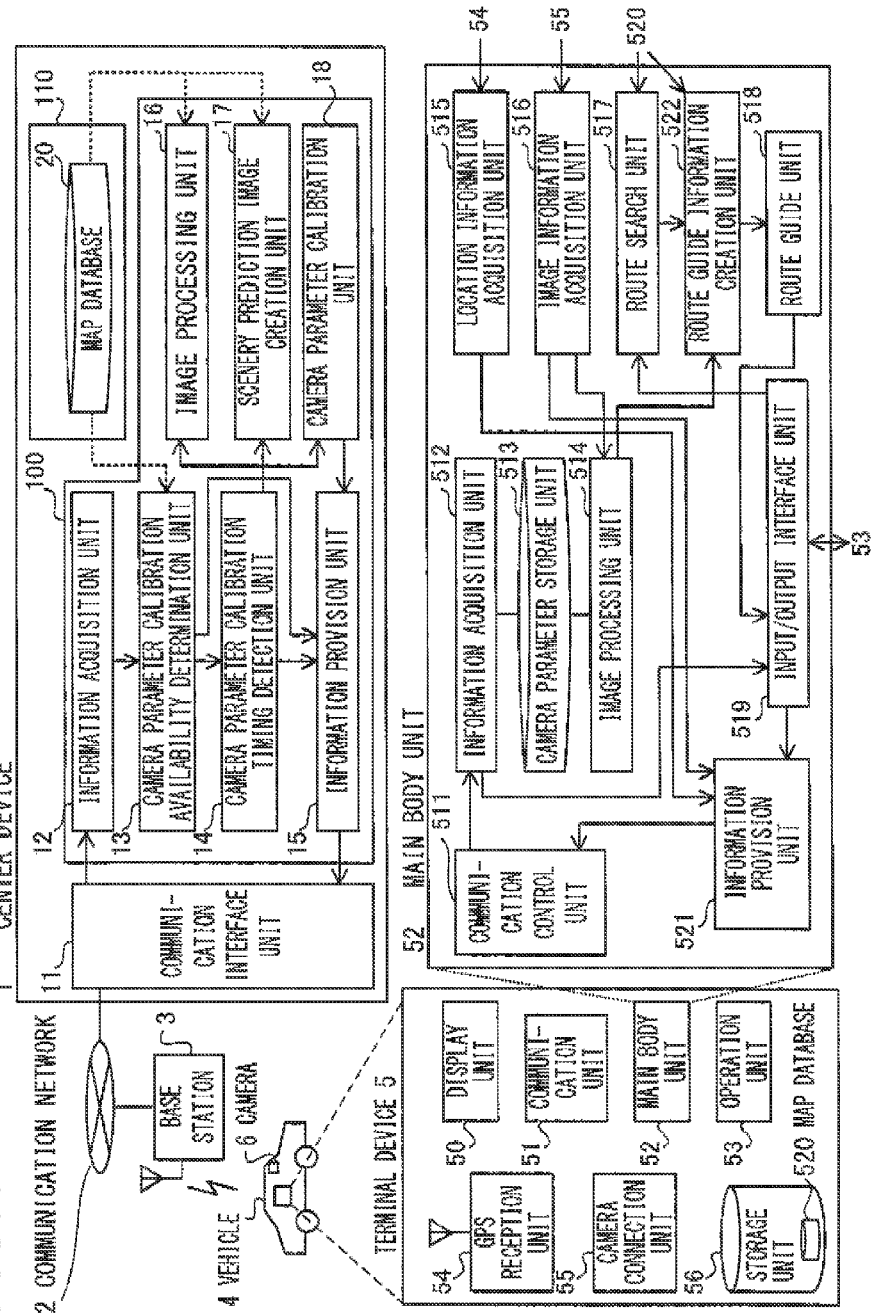
FIG. 1 is a block diagram showing the whole configuration of a navigation system.

FIG. 1 is a block diagram showing the whole configuration of a navigation system according to a first embodiment of the present invention. In the description, the terminal device of the navigation system according to this embodiment is assumed to be a navigation device.

In FIG. 1, a center device 1 according to this embodiment is connected to a communication network 2 and also wirelessly connected to a navigation device 5 mounted on a vehicle 4 via a base station 3 through a wireless communication device, for instance, a mobile phone. The navigation device 5 is connected to a camera 6. The camera 6, which is mounted on the vehicle 4, is to shoot scenery images around the current location of the vehicle 4.

The center device 1 is constituted by a so-called computer (i.e., an information processing device), which includes a center CPU (Central Processing Unit) 100 and a storage device 110 such as a semiconductor memory or a hard disk drive. The center device 1 includes functional blocks such as a communication interface unit 11, an information acquisition unit 12, a camera parameter calibration availability determination unit 13, a camera parameter calibration timing determination unit 14, an information provision unit 15, an image processing unit 16, a forward scenery prediction image creation unit 17, a camera parameter calibration unit 18, and a map database 20.

The center CPU 100 executes a predetermined program stored in an unshown program memory to implement the information acquisition unit 12, the camera parameter calibration availability determination unit 13, the camera parameter calibration timing determination unit 14, the information provision unit 15, the image processing unit 16, the forward scenery prediction image creation unit 17, and the camera parameter calibration unit 18. The map database 20 is stored in the storage device 110.

The communication interface unit 11 controls communication for the communication network 2 and also exchanges data with the navigation device 5 via the communication network 2.

The information acquisition unit 12 acquires a request for processing transmitted by the navigation device 5, image information of a scenery image in front of the vehicle 4 shot with the camera 6, location information at the current location (coordinates such as latitude and longitude, and time) of the vehicle 4, and various pieces of traveling information including, for instance, trajectory data, a moving direction and a driving speed of the vehicle 4, via the communication interface unit 11.

The camera parameter calibration availability determination unit 13 integrates the traveling information acquired by the information acquisition unit 12, such as the location information and the moving direction of the vehicle 4, with the road data read in from the map database 20 by map matching. This enables the camera parameter calibration availability determination unit 13 to acquire the road information and then identify individually and acquire various pieces of information effective for calibrating the camera parameters contained in the road information about circumjacent roads including the road on which vehicle 4 is now running, such as, for example, the width of road, the number of lanes, inclinations, and curves. The camera parameter calibration availability determination unit 13 may acquire traffic information such as weather, temperature, state of road surface, traffic congestions, road works near the road on which the vehicle 4 is running from an external information center via the information acquisition unit 12 to determine, for instance, that the information about roads under construction will be unsuitable for calibrating the camera. The external information center includes a delivery server, which delivers traffic information about, for instance, weather, temperature, state of road surface, traffic congestion, and road works and is connected to the communication network 2.

The camera parameter calibration timing detection unit 14 operates in cooperation with the scenery prediction image creation unit 17 and the image processing unit 16. The scenery prediction image creation unit 17 creates a scenery prediction image in front of the vehicle 4 based on the road data acquired by the camera parameter calibration availability determination unit 13 and on the camera parameters calculated by the camera parameter calibration unit 18 described later. The road data acquired by the camera parameter calibration availability determination unit 13 is road databased on the location information and the moving direction at the current location of the vehicle 4 acquired by the information acquisition unit 12 as described above.

The camera parameter calibration timing detection unit 14 acquires a scenery prediction image in front of the vehicle 4 from the scenery prediction image creation unit 17. The camera parameter calibration timing detection unit 14 causes the image processing unit 16 to convert the image information of the scenery image around the current location of the vehicle 4 acquired by the information acquisition unit 12 based on the camera parameters acquired by the information acquisition unit 12 and thus acquires a scenery conversion image. The camera parameter calibration timing detection unit 14 creates respective feature points or feature lines of the scenery prediction image and of the scenery conversion image on the display screen and compares the coordinates of the feature point or feature line of the scenery prediction image with each other to determine whether they are similar to each other. Based on the result of this similarity determination, the camera parameter calibration timing detection unit 14 determines whether to calibrate the posture of the camera 6 connected to the navigation device 5, which has created the image information of the scenery image around the current location of the vehicle 4, that is, the camera parameters representing the height of the mount position of the camera 6 mounted on the vehicle 4 and the direction of the camera 6 with respect to the vehicle 4.

For any determination of the camera parameter calibration timing detection unit 14 that the calibration of the camera parameters is necessary, the camera parameter calibration unit 18 calibrates the camera parameters, using image information about images of scenery around the current location of the vehicle 4 acquired by the information acquisition unit 12 and road width information about the width and the number of lanes of the road along which the vehicle 4 is running around the current location of the vehicle 4 acquired by the camera parameter calibration availability determination unit 13. As described above, the road width information is acquired by the camera parameter calibration availability determination unit 13 from the road data, which is included in the map information around the current location of the vehicle 4 that is read in from the map database 20 by the camera parameter calibration availability determination unit 13, based on the location information and the moving direction of the vehicle 4 acquired by the information acquisition unit 12.

If the camera parameter calibration availability determination unit 13 determines that it is impossible to calibrate camera parameters, the information provision unit 15 transmits the result of the determination to the navigation device 5 via the communication interface unit 11. If the camera parameter calibration timing detection unit 14 determines that the calibration of the camera parameters is unnecessary, the information provision unit 15 transmits the result of the determination to the navigation device 5 via the communication interface unit 11. If the camera parameter calibration timing detection unit 14 determines that calibration of the camera parameters is necessary, the information provision unit 15 transmits the camera parameters calculated by the calibration unit 18 to the navigation device 5 via the communication interface unit 11.

The navigation device 5 mounted on the vehicle 4 includes, for instance, a display unit 50, a communication unit 51, a main body unit 52, an operation unit 53, a GPS (Global Positioning System) reception unit 54, a camera connection unit 55, and a storage unit 56.

The navigation device 5 is a computer that includes the main body unit 52, which is a terminal CPU, and the storage device 56. The navigation device 5 may be a computer that incorporates, for instance, a disk drive such as a DVD (Digital Versatile Disk) drive, a flash memory or a reader/writer for a USB (Universal Serial Bus) memory that are unshown. The storage device 56, which is constituted by a semiconductor memory or a hard disk drive, contains a map database 520. The operation unit 53 includes various types of input devices such as a switch, a button, a touch panels, a remote control device, a sound microphone and an output device such as a sound speaker. The display unit 50 is constituted by an LCD (Liquid Crystal Display) or the like. The communication unit 51 is connected to the center device 1 via the base station 3 and the communication network 2 to enable wireless data communication. The GPS reception unit 54 receives radio waves from an unshown GPS satellite to detect the current location of the vehicle 4. The camera connection unit 55, which is connected to the camera 6, incorporates the image information about the scenery image in front of the vehicle 4 captured by the camera 6.

The main body unit 52 includes various functional blocks, for instance, a communication control unit 511, an information acquisition unit 512, a camera parameter updating unit 513, an image processing unit 514, a location information acquisition unit 515, an image information acquisition unit 516, a route search unit 517, a route guide unit 518, an input/output interface unit 519, and a route guide information creation unit 522. These functional blocks are implemented by execution by the main body unit 52 of a predetermined program stored in an unshown program memory.

The communication control unit 511 controls communication of the communication unit 51, which performs communication through a mobile phone or a wireless LAN. The communication control unit 511 also exchanges data with the center device 1 via the base station 3 and the communication network 2. The input/output interface unit 519 converts input information from the operation unit 53, such as a switch, a button, sound, or a touch panel into various pieces of information, for instance, a destination or request information to the center device 1 and input the converted information to the main body unit 52. Also, the input/output interface unit 519 outputs display information or sound information, such as map information and guide information created by the route guide unit 518, to the display unit 50 and/or the sound output device of the operation unit 53.

The location information acquisition unit 515 acquires GPS information such as information about latitude and longitude, height, and time detected by the GPS reception unit 54 and the posture information such as the moving direction of the vehicle 4 from an unshown posture sensor mounted on the vehicle 4 and stores the acquired information in the storage device 56. In some embodiments, the location information acquisition unit 515 acquires driving information of the vehicle 4, such as brake information and information about operation of winkers, a parking brake, and steering together with the above-described location information via an unshown in-vehicle network, for instance, CAN (Controller Area Network) and the storage unit 56 stores the acquired information as traveling trajectory information.

The information provision unit 521 transmits, for instance, location information about the current location of the vehicle 4 acquired from the location information acquisition unit 515 and image information such as the scenery image in front of the vehicle 4 acquired by the image information acquisition unit 516 to the center device 1 to request updating of the camera parameters. This occurs at the time when the navigation device 5 is powered on (when the travel starts), when a route is requested by the input/output interface unit 519, when movement of the vehicle 4 is detected from the data acquired by the location information acquisition unit 515, or at a predetermined time.

The information acquisition unit 512 acquires various types of information including the camera parameters transmitted from the center device 1 via the communication unit 51 and the communication control unit 511. The information acquisition unit 512 causes the acquired camera parameters to be stored in the camera parameter storage device 513.

The image information acquisition unit 516 acquires image information of the scenery image in front of the vehicle 4 captured by the camera 6. The image information acquired by the image information acquisition unit 516 is transmitted by the communication unit 51 to the center device 1 via the information provision unit 521 and the communication control unit 511. The image information of the scenery image acquired by the image information acquisition unit 516 is also transferred to the image processing unit 514. The transferred scenery image is subjected to coordinates conversion based on the camera parameters and this converted image can used for detecting terrestrial objects surrounding the vehicle 4.

The image processing unit 514 acquires the image information about the scenery image in front of the vehicle 4 captured by the camera 6 from the image information acquisition unit 516 and converts the coordinates of the acquired scenery image using the camera parameters stored in the camera parameter storage device 513 to acquire a scenery conversion image that corresponds to a scenery that a crew of the vehicle 4 would view at its current location. The image processing unit recognizes, based on that scenery conversion image, various surrounding terrestrial objects including, for instance one or more of the roads, marks, buildings, persons, or forward vehicles and provides the result of the recognition to the route guide unit 518.

The route search unit 517 reads in road network information from the map database 520 in response to a request for a route inputted via the input/output interface unit 519 and calculates a recommended route from the departure place, i.e., the current location of the vehicle 4, to the destination. The route search unit 517 searches, as the recommended route, a minimum cost route based on a traveling time or speed and a distance per road link by using a mathematical technique, for instance, the Dijkstra's algorithm. The route search unit 517 sends route information about the recommended route thus searched to the route guide unit 518.

The route guide information creation unit 522 creates guide information to the destination based on the information about the surrounding terrestrial objects provided by the image processing unit 514 and the route information provided by the route search unit 517. Based on the guide information created by the route guide information creation unit 522, the route guide unit 518 guides the vehicle 4 along the recommended route to the destination via the input/output interface unit 519 and the operation unit 53.

In the embodiment shown in FIG. 1, the image processing unit 16 at the center device 1 calculates the feature points (or feature lines), such as roads or buildings, from the image information sent from the navigation device 5. However, the image processing unit 514 at the navigation device 5 may calculate these feature points (or feature lines) and transmit the result to the center device 1. This eliminates the need for sending the image information from the navigation device 5 to the center device 1, thus reducing the amount of communication considerably.

In the embodiment shown in FIG. 1, the navigation device 5 performs guidance utilizing the result of recognition of the surrounding terrestrial objects performed in the image processing unit 514. However, the image processing unit 16 at the center device 1 may perform recognition of the surrounding terrestrial objects as in the navigation system shown in FIG. 16. In this case, information about the locations and distances of the surrounding terrestrial objects is transmitted from the center device 1 to the navigation device 5. This eliminates the need for image processing unit 514 at the navigation device 5, decreasing the load of processing at the navigation device 5 and enabling guidance to the destination by using image processing without increasing the throughput of the CPU of the main body unit 52 accordingly. To recognize the surrounding terrestrial objects accurately, it is desirable to store detailed and updated information about the surrounding terrestrial objects, such as the shapes and widths of roads, lane information, the shapes and heights of buildings in the map database 520. In the navigation system shown in FIG. 16, the map database 20 at the center device 1 holds detailed and updated information about the surrounding terrestrial objects to enable the image processing unit 16 at the center device 1 to perform image processing for recognizing the surrounding terrestrial objects accurately. This enables guidance to the destination utilizing image processing without resort to a large volume map database 520 at the terminal device 5.

(Flowchart of the Camera Parameter Calibration Availability Determination Unit 13)

Figure 2:
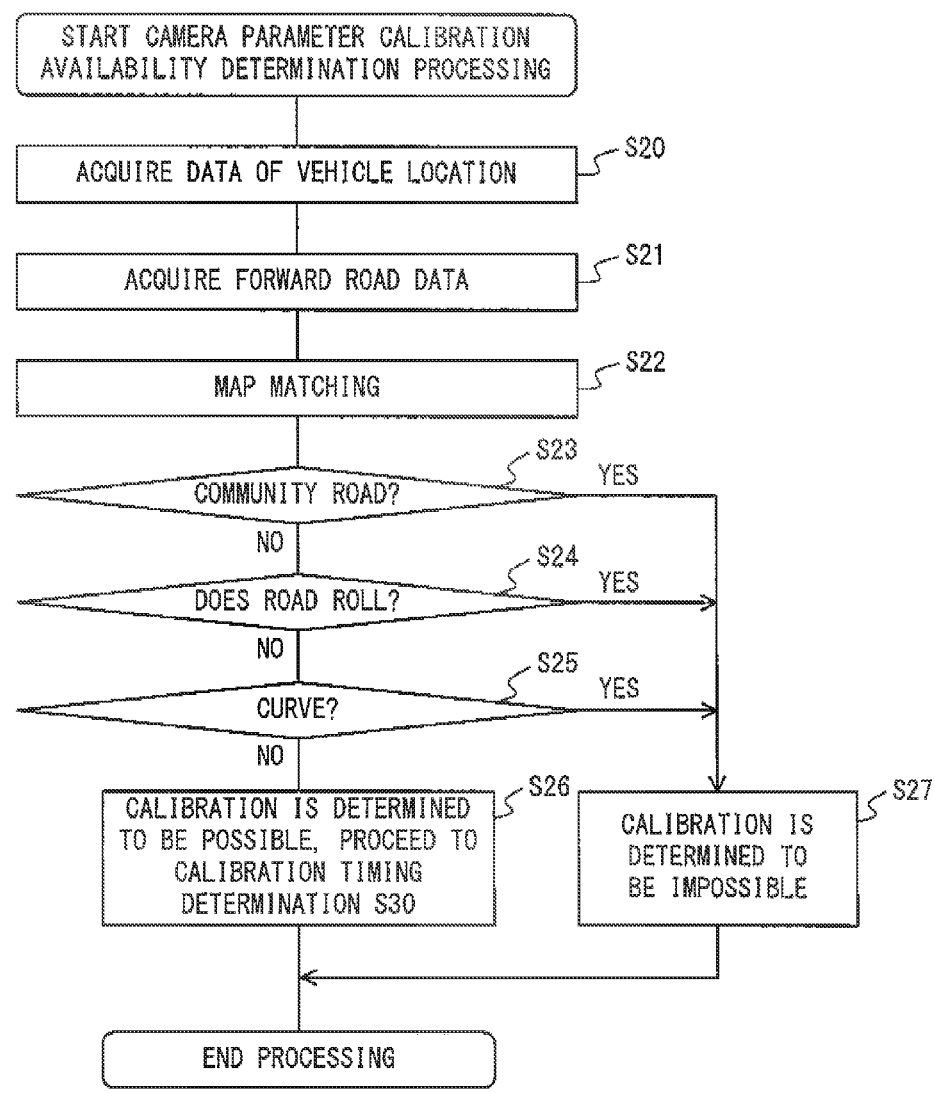
FIG. 2 is a flowchart of the processing executed at the center device to determine availability of calibration of camera parameters.

FIG. 2 is an example of the flowchart illustrating the process at the camera parameter calibration availability determination unit 13 included in the center CPU 100 of the center device 1 according to the present embodiment. The camera parameter calibration availability determination unit 13 determines whether calibration of the camera parameters of the camera 6 by the camera parameter calibration unit 18 is possible. The center CPU 100 receives the request information from the navigation device 5 received by the communication interface unit 11 to start the camera parameter calibration availability process and execute the processing in each of the steps described later. When this process starts, the information acquisition unit 12 acquires the request information from the navigation device 5 received by the communication interface unit 11. The camera parameter calibration availability determination unit 13 acquires information, for instance, location information represented by the latitude and the longitude of the vehicle 4 and the moving direction of the vehicle 4 included in the request information acquired by the information acquisition unit 12 (step S20). The camera parameter calibration availability determination unit 13 acquires the road data about the surrounding of the vehicle at the current location including a part in front of the vehicle 4 from the map database 20 based on the location information and the moving direction of the vehicle 4 (step S21). The camera parameter calibration availability determination unit 13 identifies the road on which the vehicle 4 runs by map matching processing (step S22). Based on road data including the information about the road on which the vehicle 4 now runs and/or the information about secondary roads around the vehicle 4 road data, the camera parameter calibration availability determination unit 13 determines whether the road on which the vehicle 4 now runs satisfies predetermined road conditions around the current location in steps S23, S24, and S25.

The camera parameter calibration availability determination unit 13 confirms whether the road on which the vehicle 4 now runs or the secondary road around it is a community road (step S23). Any road data that fails to contain detailed road information or accurate road information, or any road data that contains road data corresponding to a road having predetermined road attribute is determined to be a community road. The predetermined road attribute means for instance, a width of a road smaller than a predetermined width, a number of lanes which is smaller than a predetermined number, a specified type of road such as a narrow street, or a type of link other than a main link that is divided into an upline and a downline. If the camera parameter calibration availability determination unit 13 determines that the road of interest is the road on which the vehicle 4 now runs or a community road (yes in step S23), it determines that the current location of the vehicle 4 is contained in an area in which calibration of the camera parameters is impossible and outputs the result of the determination (step S27). Then, this processing completes.

In step S23, if the road data corresponding to the road on which the vehicle 4 now runs or the secondary road contains detailed road information or accurate road information (no in step S23), the camera parameter calibration availability determination unit 13 confirms whether the road on which the vehicle 4 now runs or the secondary road is rolling (step S24). If the road on which the vehicle 4 now runs or the secondary road is sloping or rolling (yes in step S24), the camera parameter calibration availability determination unit 13 determines that the road on which the vehicle 4 now runs or the secondary road is included in an area in which the calibration of the camera parameters is impossible and outputs the result of the determination (step S27). Then this processing completes. For instance, for any road having an inclination greater than a predetermined inclination value as determined based on the inclination information or height information contained in the road link data, it determines that the road rolls. If the road on which the vehicle 4 now runs or the secondary road is neither sloping nor rolling (no in step S24), the camera parameter calibration availability determination unit 13 confirms whether a road section around the current location, on which section the vehicle 4 is scheduled to travel (or a road section on which the vehicle 4 will travel in a high probability) is linear (step S25). Any road section that is short and has many turnabouts, such as right or left turns, or that includes curves is determined to be non-linear. For instance, any road having a curvature, which is based on curvature information contained in the road link data, larger than a predetermined value is determined to be non-linear. For instance, any road that includes two continuous road sections among road sections around the current location of the vehicle 4 on which the vehicle 4 is scheduled to travel, with the two road sections being connected with a connection angle smaller than a predetermined angle, is determined to be non-linear.

For any road section around the current location of the vehicle 4 that is non-linear (no in step S25), the camera parameter calibration availability determination unit 13 determines that the current location of the vehicle 4 is in an area where the calibration of the camera parameters is impossible and outputs the result of determination (step S27). Then this processing completes. The road section around the current location of the vehicle 4 being linear (yes in step S25) means that the camera parameter calibration availability determination unit 13 determines that the road on which the vehicle 4 now runs satisfies the predetermined road conditions around the current location. In this case, camera parameter calibration availability determination unit 13 determines that calibration of the camera parameters is possible and outputs the result of determination (step S26) to complete this processing.

(Flowchart of Camera Parameter Calibration Timing Detection Unit 14)

Figure 3:
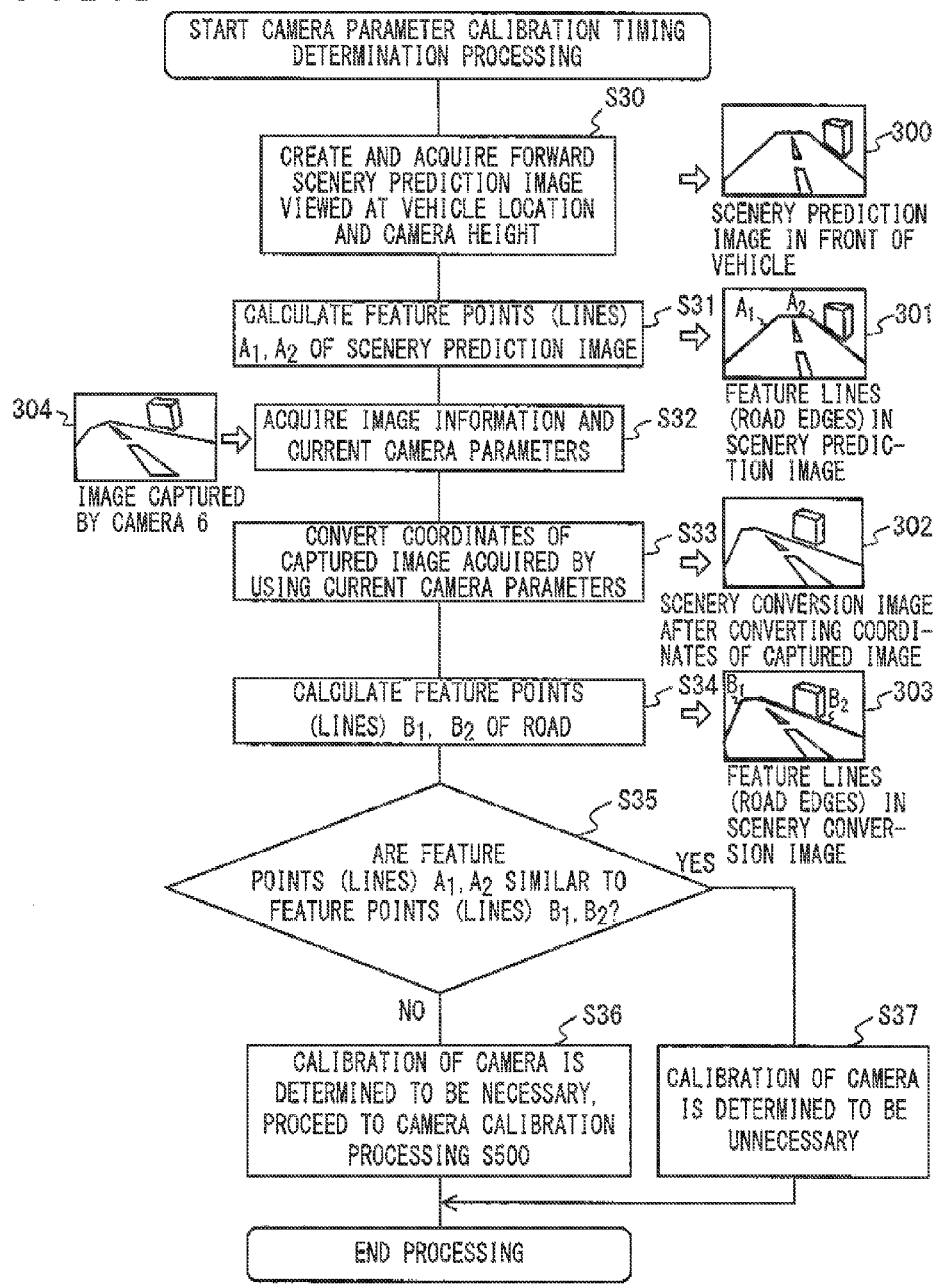
FIG. 3 is a flowchart of the processing executed at the center device to determine the timing of calibration of camera parameters.

FIG. 3 is a flowchart of the processing of the camera parameter calibration timing detection unit 14 included in the center CPU 100 at the center device 1 according to the present embodiment. The camera parameter calibration timing detection unit 14 determines whether or not the calibration of the camera parameters is necessary.

Upon the determination by the camera parameter calibration availability determination unit 13 included in the center CPU 100 at the center device 1 that the calibration of the camera parameters is possible, the camera parameter calibration timing detection unit 14 causes the scenery prediction image creation unit 17 to create a scenery prediction image in front of the vehicle 4 and acquires the created scenery prediction image (step S30). The scenery prediction image is created as if it was viewed from a visual point at the height of the camera. A display example 300 represents the created scenery prediction image. The height of the camera in this case may be set to the vehicle height in advance. Alternatively, for the camera 6 that has a GPS function therein, the height of the camera may be set to the height in the height information obtained from the GPS. Then, the camera parameter calibration timing detection unit 14 cause the image processing unit 16 to extract the feature points (feature lines) of the surrounding terrestrial objects such as roads and buildings on the coordinates of the display screen from the scenery prediction image by calculation based on the road data (step S31). The present embodiment is now described assuming that the feature point (feature line) is a road edge. A display example 301 shows an example of such a road edge. Line segments A1 and A2 are edge lines of a forward road in the scenery prediction image.

Then, the camera parameter calibration timing detection unit 14 acquires image information about the scenery image including the road in front of the vehicle 4, captured by the camera 6 and acquired by the information acquisition unit 12 (as shown in a display example 304) as well as the current camera parameters, and then transfers these to the image processing unit 16 (step S32). The camera parameter calibration timing detection unit 14 causes the image processing unit 16 to perform coordinates conversion on the transferred image information about the scenery image with the transferred current camera parameters to create a converted image that corresponds to an actual scenery that is to be viewed at the current location of the vehicle 4 (step S33). A display example 302 shows an example of the created actual scenery. The camera parameter calibration timing detection unit 14 causes the image processing unit 16 to extract the feature points (feature lines) of the surrounding terrestrial objects on the coordinates of the display screen from the actual scenery by image processing calculation (S34). A display example 303 shows examples of road edges in the actual scenery. Line segments B1 and B2 correspond to the respective edge lines of the forward road.

The road edges A1 and A2 and the road edges B1 and B2 correspond to one and the same road and thus the edges A1 and A2 shall coincide with the edges B1 and B2, respectively, seeing that the same scenery shall be obtained when viewed from the same visual point. The camera parameter calibration timing detection unit 14 determines whether the road edges A1 and A2 are similar to the road edges B1 and B2, respectively, by comparing the coordinates of the road edges A1 and A2 with those of the road edges B1 and B2, respectively, on the screen (step S35). If no such a similarity is recognized (no in step S35), the camera parameter calibration timing detection unit 14 determines whether or not the calibration of the camera parameters is necessary and outputs the result of determination to complete this processing (step S36). If such a similarity is recognized (yes in step S35), the camera parameter calibration timing detection unit 14 determines that the calibration of the camera parameters is unnecessary and outputs the result of determination to complete this processing (step S36).

Figure 4:
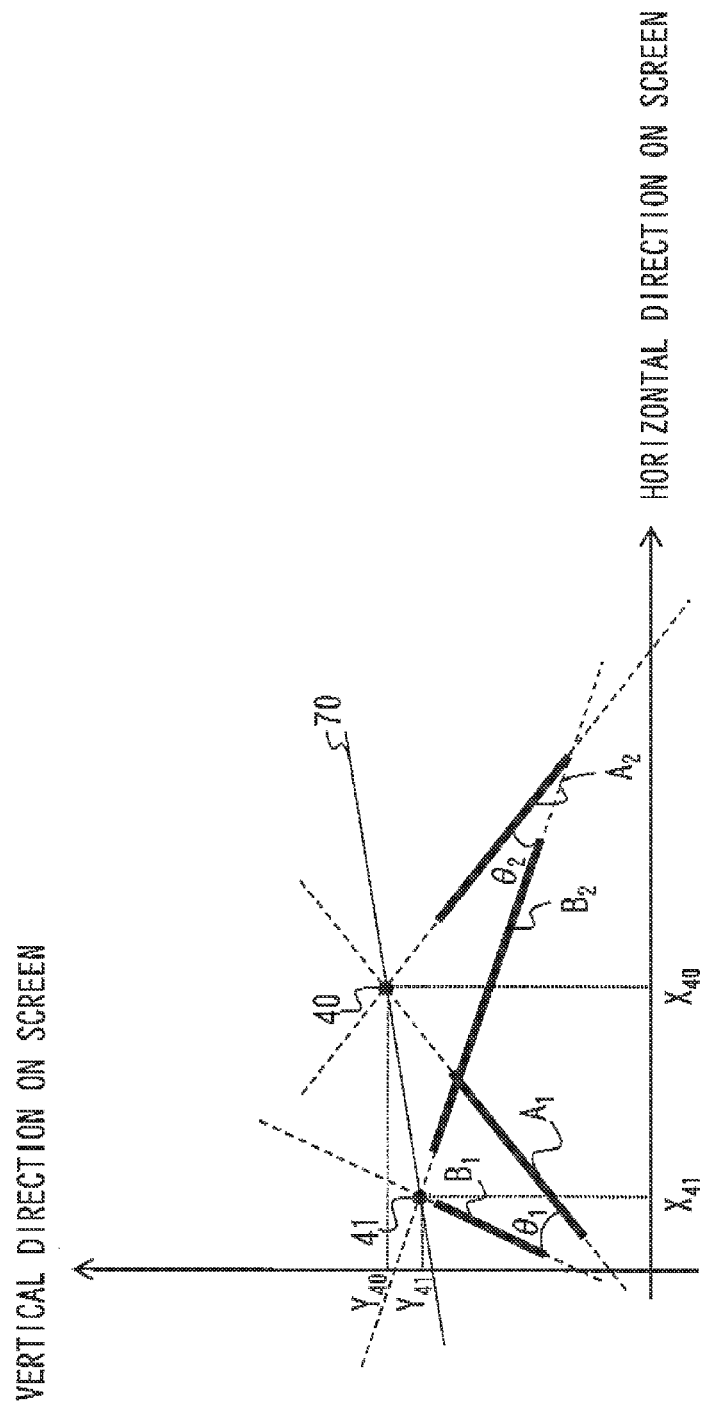
FIG. 4 is a diagram to supplement the illustration of the processing of determining the timing of calibration of camera parameters.

FIG. 4 is a diagram for explaining supplementarily the processing for judging the similarity of road edges in step S35 in FIG. 3. In the figure, the road edges A1 and A2 are those extracted from the scenery prediction image and the road edges B1 and B2 are those extracted from the actual scenery. Points 40 and 41 are vanishing points obtained from the respective edges. The camera parameter calibration timing detection unit 14 calculates differences in display coordinates of vanishing points from X components X40 and X41 and Y components Y40 and Y41 of the vanishing points in the horizontal direction (X direction) and in the vertical direction (Y direction) on the screen, and determines that no similarity is present between the two vanishing points if the differences are outside respective predetermined ranges. The absence of similarity may also be determined based on differential angles of respective edge lines in the figure, i.e., a differential angle θ1 (an angle formed by the road edges A1 and B1) and a differential angle θ2 (an angle formed by the road edges A2 and B2) instead of the differences in coordinates. In this case, for any difference in angle equal to or greater than a predetermined angle, absence of similarity between the two vanishing points may be determined. If the road edges A1 and B1 and the road edges A2 and B2, respectively, are parallel to each other, or if no difference in angle is found within the range of effective display coordinates, it may be determined that no similarity is present between the two vanishing points.

(Flowchart of the Processing at the Camera Parameter Calibration Unit 18)

Figure 5:
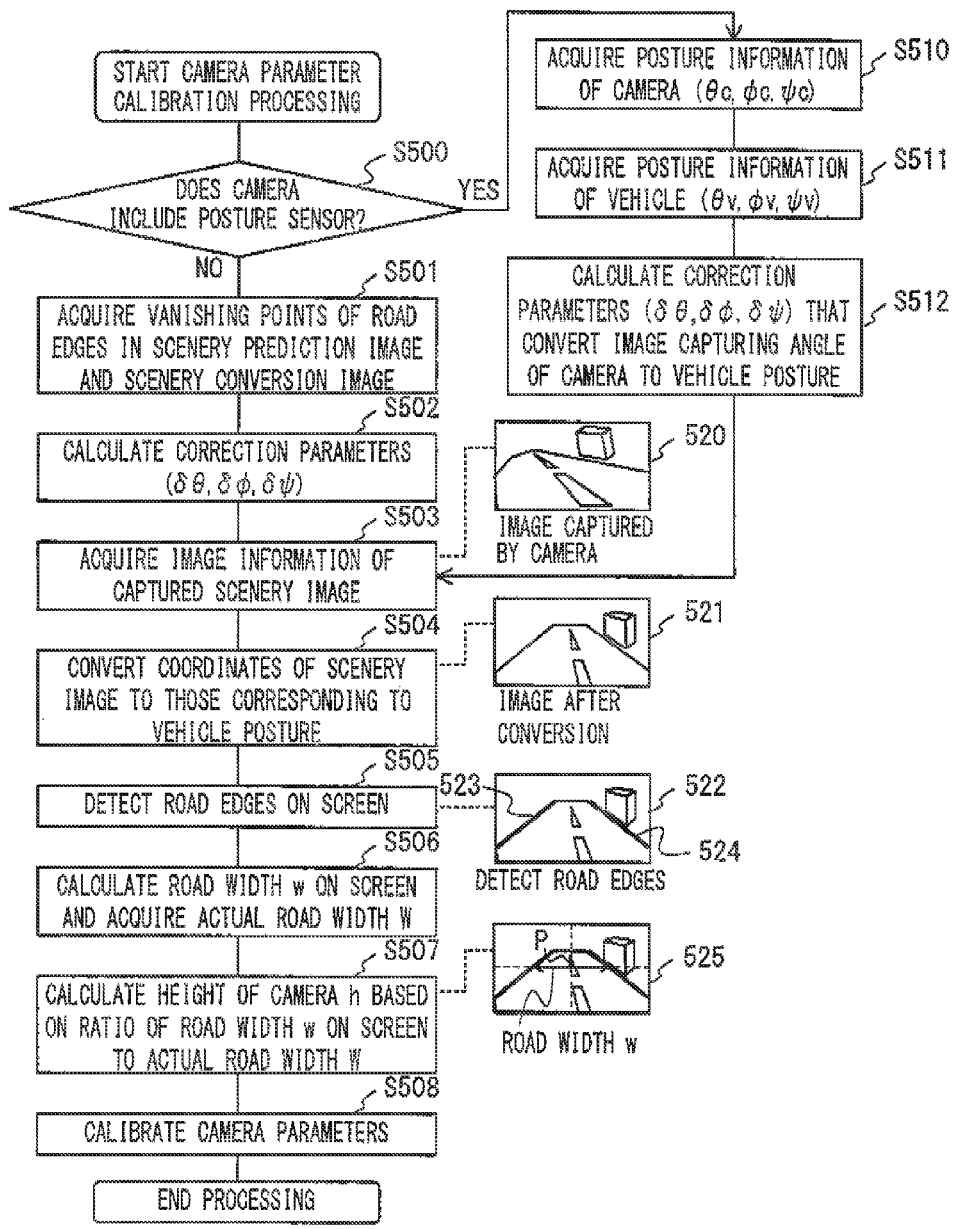
FIG. 5 is a flowchart of the processing executed at the center device to calibrate camera parameters.
Figure 6:
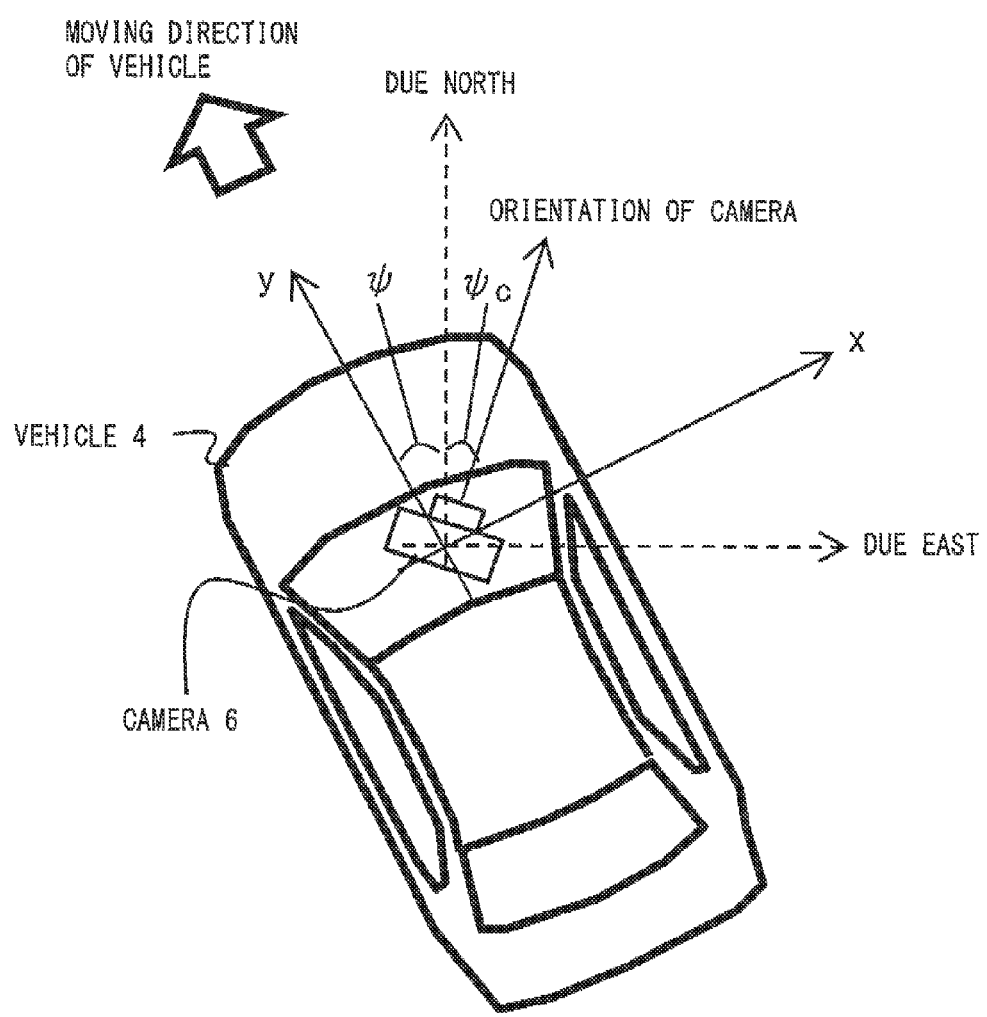
FIG. 6 is a diagram to supplement the illustration of step S508 in the processing of calibrating camera parameters shown in FIG. 5.

FIG. 5 is a flow chart of the processing of camera parameter calibration calculation at the camera parameter calibration unit 18 included in the center CPU 100 of the center device 1 according to the present embodiment. The camera parameter calibration unit 18 calculates the camera parameters. FIG. 6 is a diagram for supplementarily explaining the processing in step S508 in the flowchart shown in FIG. 5 and FIGS. 7 through 9 for supplementarily explaining the processing in step S502.

If the camera parameter calibration timing detection unit 14 determines that the calibration of the camera parameters is necessary, the camera parameter calibration unit 18 confirms if the camera 6 mounted on the vehicle 4 has a posture sensor such as a gyro sensor and if posture information obtained by such a posture sensor has been obtained by the information acquisition unit 12 via the communication interface unit 11 (step S500). It is assumed that the posture of the camera is expressed in terms of a pitch angle $\theta c$, a roll angle $\varphi c$, and a yaw angle $\psi c$. For any posture information of the camera 6 (yes in step S500), the camera parameter calibration unit 18 acquires the posture information ($\theta c$, $\varphi c$, $\psi c$) of the camera (step S510). Subsequently, the camera parameter calibration unit 18 acquires the posture information ($\theta v$, $\varphi v$, $\psi v$) of the vehicle 4 (step S511). If the vehicle 4 has a posture sensor such as a gyro sensor and if any posture information of the vehicle 4 obtained by such a posture sensor is acquired at the navigation device 5, the information acquisition unit 12 acquires the posture information ($\theta v$, $\varphi v$, $\psi v$) of the vehicle 4 via the communication interface unit 11. The camera parameter calibration unit 18 acquires the posture information ($\theta v$, $\varphi v$, $\psi v$) of the vehicle 4. If no posture information of the vehicle 4 is available, the camera parameter calibration unit 18 calculates the direction of the vehicle 4 based on the location information including traveling trajectories in the past of the vehicle 4 to set the posture ($\theta v$, $\varphi v$, $\psi v$) of the vehicle 4.

Then, the camera parameter calibration unit 18 calculates correction parameters for correcting any distortion that will occur in the image captured by the camera 6 depending on the direction of the camera 6 based on the posture information of the camera 6 and the posture information of the vehicle 4 described above (step S512). This processing is supplementarily explained referring to FIG. 6. FIG. 6 shows differences between the posture of the camera and the posture of the vehicle by taking as examples a rotation angle and a yaw angle around the z axis vertical to the plane of the figure. The camera 6 is arranged in the cabin of the vehicle 4 and the direction of the camera 6 is not always identical to the moving direction (the forward direction) of the vehicle 4. Thus, the image captured by the camera 6 need to be converted into scenery viewed from the vehicle 4 by using the respective pieces of angle information obtained from the sensors described above. In a case that the posture sensors output respective pieces of angle information $\psi c$ and $\psi v$ taking due north as a reference, rotation of the yaw angle among the angles of image capturing corresponding to an image captured by the camera 6 by $\delta\psi=\psi c+\psi v$ allows the corrected angle to be identical to the yaw angle of the posture of the vehicle. This rotation amount $\delta\psi$ is designated as a correction parameter for the yaw angle. For the pitch angles and the roll angles about the two other axes, the correction parameters $\delta\theta$, $\delta\varphi$ corresponding to rotation angles, which make the angle of image capturing identical to the posture of the vehicle by rotational locomotion, are calculated.

Then, the camera parameter calibration unit 18 acquires the image information of the scenery image captured by the camera 6 (step S503). An image 520 shows an example of this scenery image. The camera parameter calibration unit 18 subjects the image 520 to coordinates conversion by using the correction parameters calculated in step S512 to create an image 521 viewed from the vehicle 4 (step S504). The camera parameter calibration unit 18 detects the feature point (feature line) of the image 521. In this embodiment, the camera parameter calibration unit 18 detects road edges 523 and 524 as the feature points (feature line) of the image 521 (step S505). The camera parameter calibration unit 18, as shown in an image 525, calculates a width of road (width) w based on a center line that passes a center point of the screen P and the road edges detected in step S505. The camera parameter calibration unit 18 acquires an actual width of road (width) W that corresponds to the road on the screen based on the road data acquired according to the current location included in the map database 20 (step S506). The camera parameter calibration unit 18 calculates the height h of mount position of the camera based on a ratio of the road width on the screen w to the actual road width W (step S507). The camera parameter calibration unit 18 calibrates the camera parameters by assuming the correction parameters ($\delta\theta$, $\delta\varphi$, $\delta\psi$) representing the direction of the camera calculated in step S512 and the height h of the mount position of the camera calculated in step S507 as new camera parameters for converting the image information about the scenery image captured by the camera 6 (step S508) to complete this processing.

If no camera posture information is available (no in step S500), the camera parameter calibration unit 18 calculates the correction parameters ($\delta\theta$, $\delta\varphi$, $\delta\psi$) for the camera 6 by using the scenery prediction image in front of the vehicle created in step S30. First, the camera parameter calibration unit 18 acquires the vanishing points 40 and 41 of the road edges obtained from the scenery prediction image representing predicted scenery and the scenery conversion image representing the actual scenery (step S501). It calculates the correction parameters ($\delta\theta$, $\delta\varphi$, $\delta\psi$) based on the straight line 70 that passes the vanishing points 40 and 41 shown in FIG. 4 (step S502). The method of calculating camera parameters by using a plurality of vanishing points is disclosed by, for instance, Japanese Laid Open Patent Publication No. 2008-11174. In this embodiment, one of the vanishing points is acquired from the scenery prediction image corresponding to the predicted scenery. This enables the correction parameters to be obtained in case that only one vanishing point is obtained from the scenery conversion image corresponding to the actual scenery.

Figure 7:
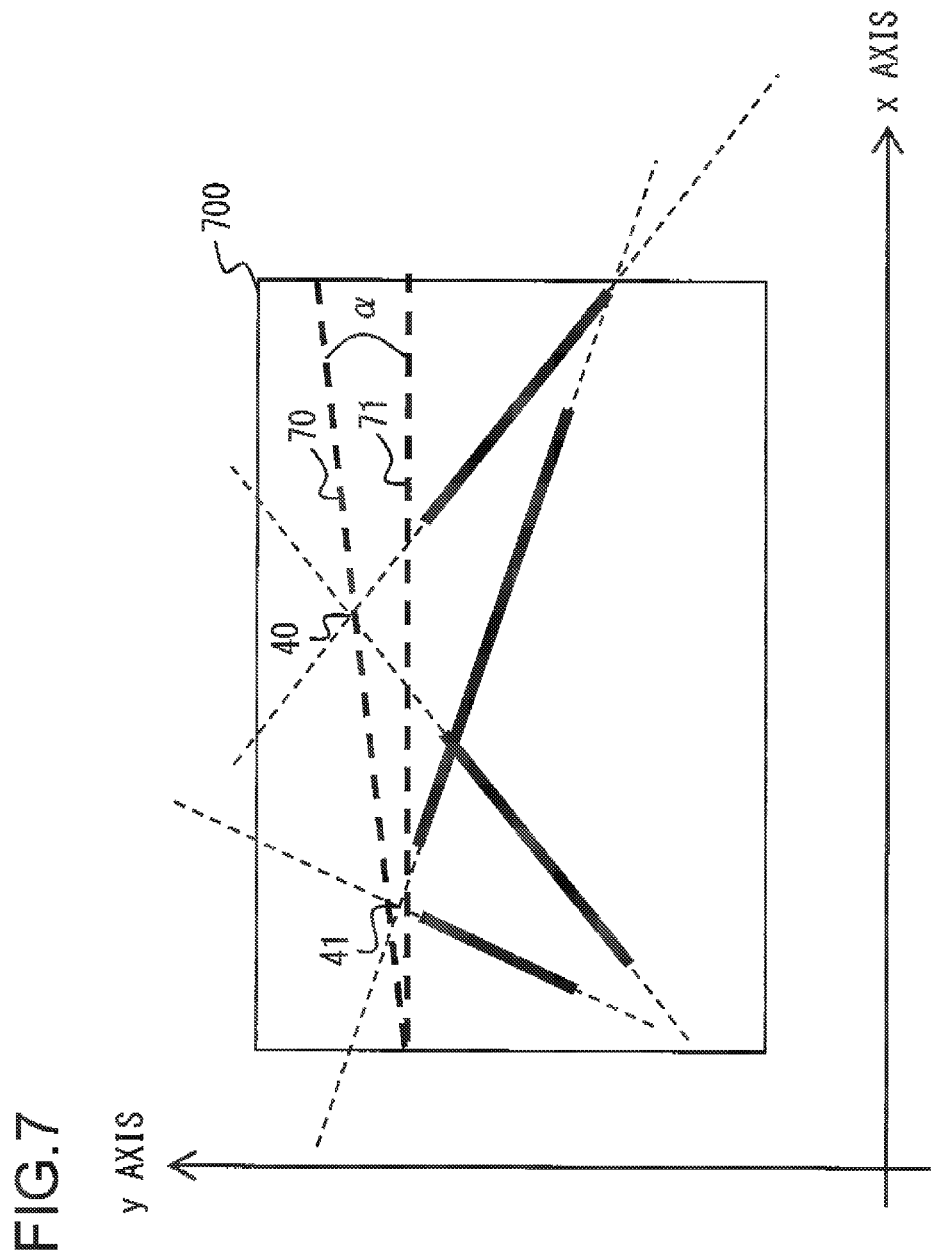
FIG. 7 is a diagram to supplement the illustration of step S502 in the processing of calibrating camera parameters shown in FIG. 5.
Figure 8:
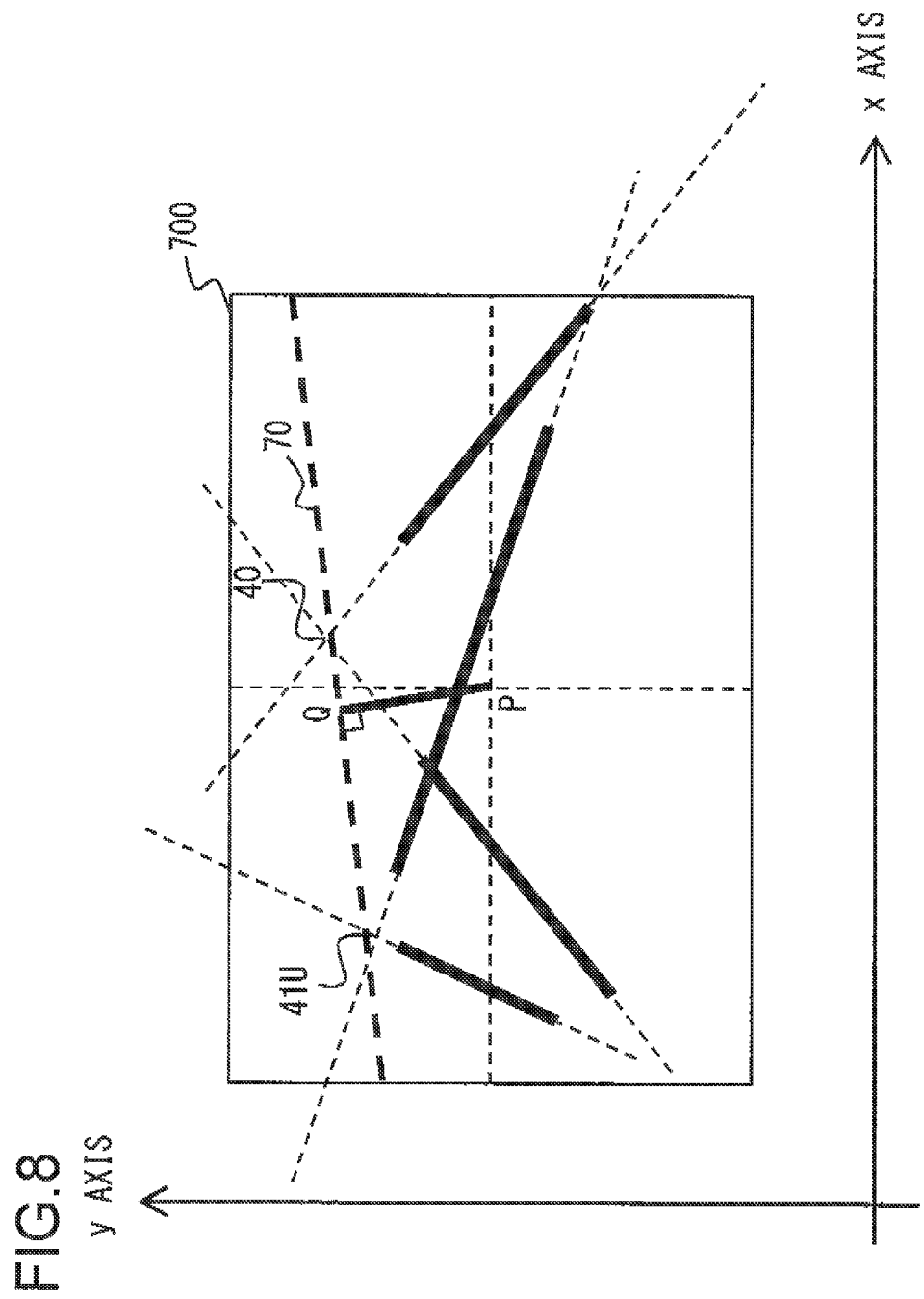
FIG. 8 is a diagram to supplement the illustration of step S502 in the processing of calibrating camera parameters shown in FIG. 5.
Figure 9:
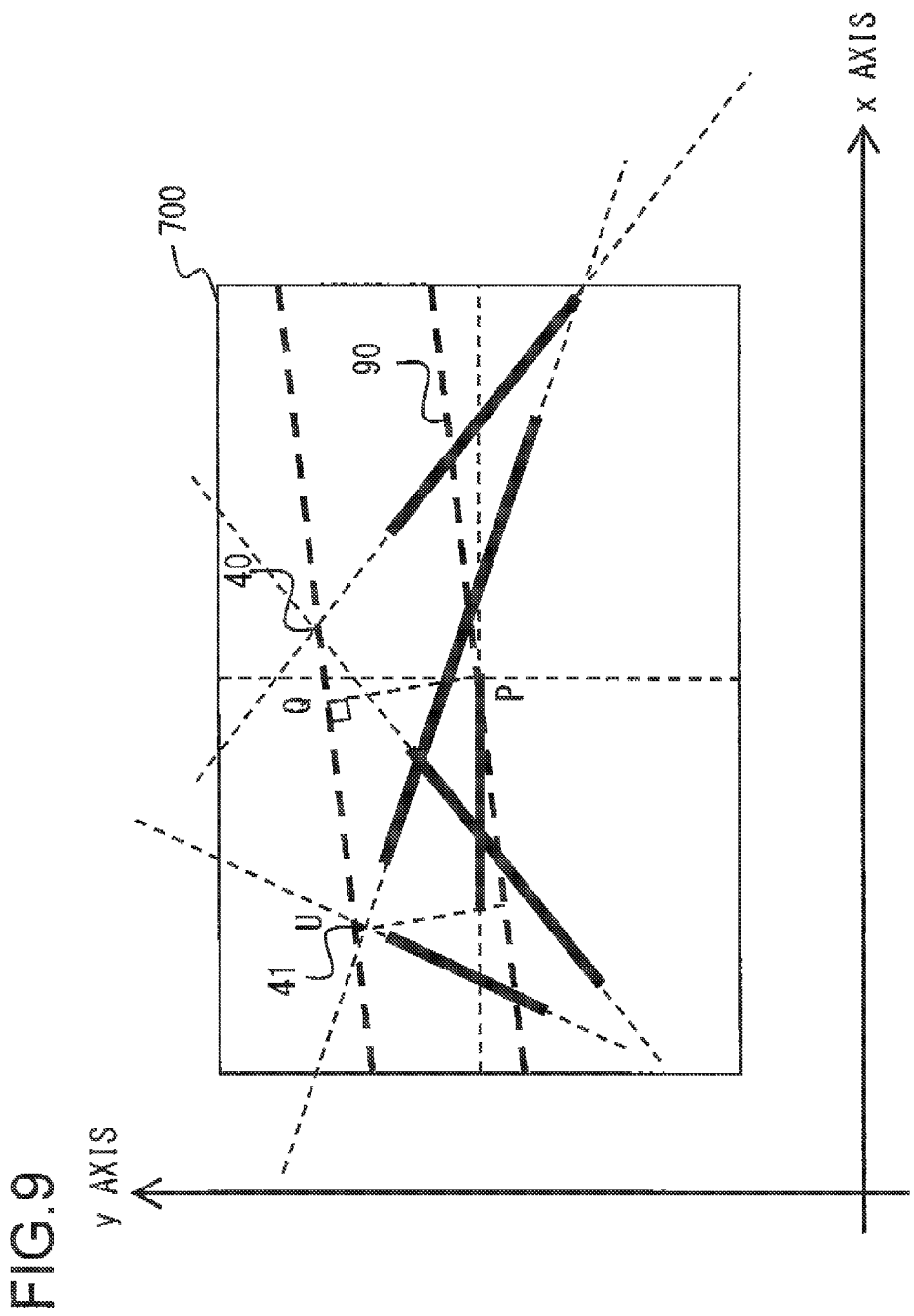
FIG. 9 is a diagram to supplement the illustration of step S502 in the processing of calibrating camera parameters shown in FIG. 5.

The processing in step S502 is explained supplementarily referring to FIGS. 7 through 9. First, a method of calculating the correction parameter $\delta\varphi$ for the roll angle is explained referring to FIG. 7. A direct line 70 that passes the vanishing points 40 and 41 and a direct line 71 parallel to the direction of the horizontal direction (x axis direction) of a screen 700 are drawn. The angle $\alpha$ formed by the two straight lines is calculated and the calculated angle $\alpha$ is designated as a correction parameter $\delta\varphi$ for the roll angle.

FIG. 8 is a diagram for supplementarily explaining the correction parameter 80 for the pitch angle. A point Q is a foot of a perpendicular dropped from the screen center point P to the straight line 70. For any known value of the focal distance f of the camera 6, the correction parameter 80 for the pitch angle can be given by the expression (1) below.

[Math 1]

$$\delta\theta = \tan^{-1}\{\text{line segment } PQ/f\} \quad (1)$$

FIG. 9 is a diagram for supplementarily explaining setting of the correction parameter $\delta\psi$ for the yaw angle. The X axis component of the line segment QU is obtained by designating the vanishing point 41 as a point U and the correction parameter δψ for the yaw angle is calculated according to the expression (2).

[Math 2]

$$\delta\psi = \tan^{-1}\{\text{line segment } QU \cdot \cos \delta\theta / f\} \quad (2)$$

Then, the camera parameter calibration unit 18 acquires the image information of the scenery image captured by the camera 6 (step S503). The camera parameter calibration unit 18 converts the coordinates of the scenery image acquired in step S503 with the correction parameters (δθ, δφ, δψ) obtained in step S502 (step S504) to detect the road edges on the screen after the conversion (step S505). The camera parameter calibration unit 18 calculates the road width (width) w on the screen. The camera parameter calibration unit 18 acquires the actual road width (width) W of the actual road corresponding to the road on the screen from the road data acquired depending on the current location included in the map database 20 (step S506). The camera parameter calibration unit 18 calculates the height of the mount position of the camera based on the ratio of the road width w on the screen to the actual road width W (step S507). The camera parameter calibration unit 18 calibrates the camera parameters by assuming the camera parameters calculated in steps S502 and S507 as new camera parameters (step S508) to complete this processing.

(Flowchart of the Whole Processing at the Navigation System)

Figure 10:
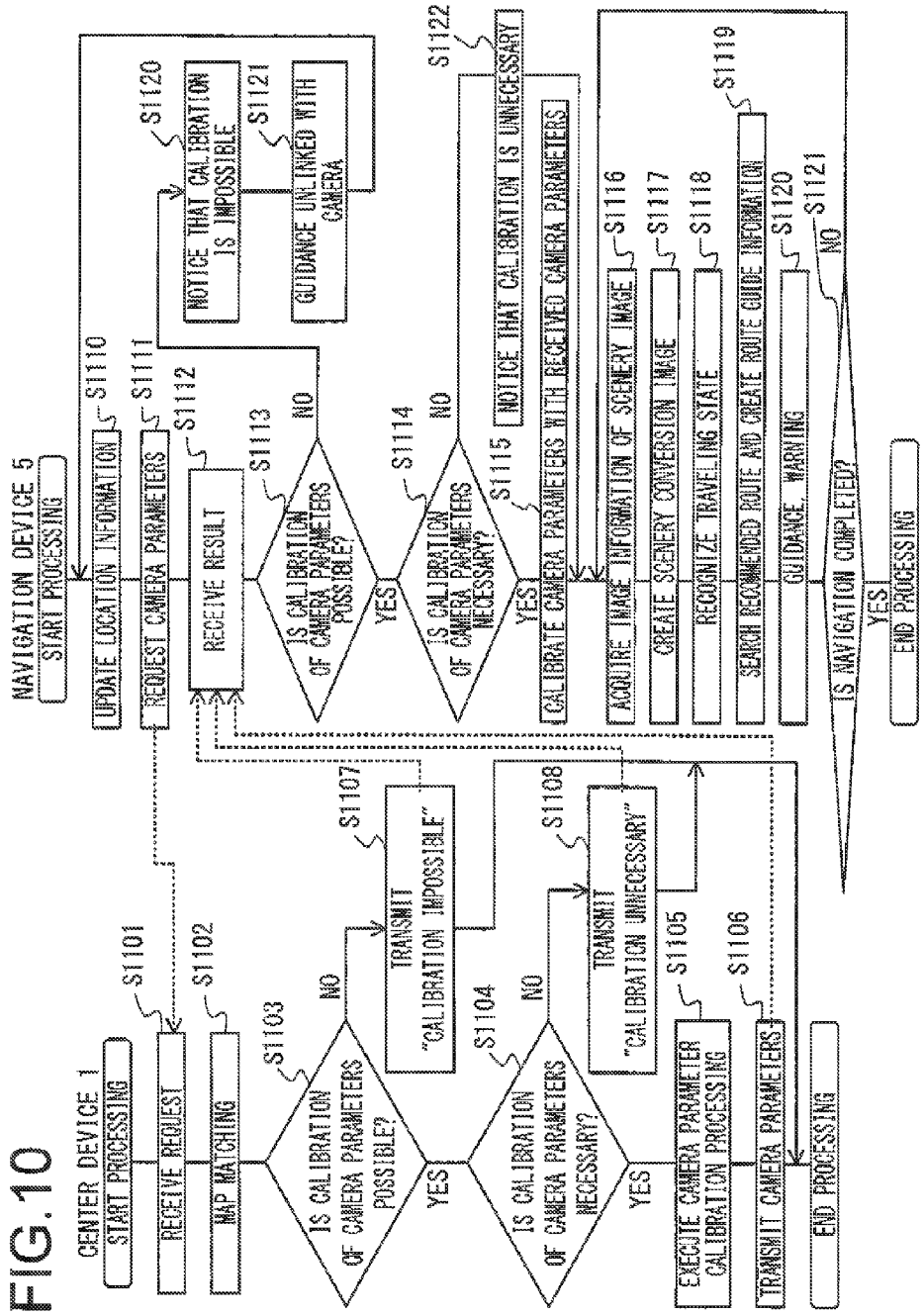
FIG. 10 is a flowchart of the processing executed at the navigation system to perform guidance to a destination using image information.
Figure 14:
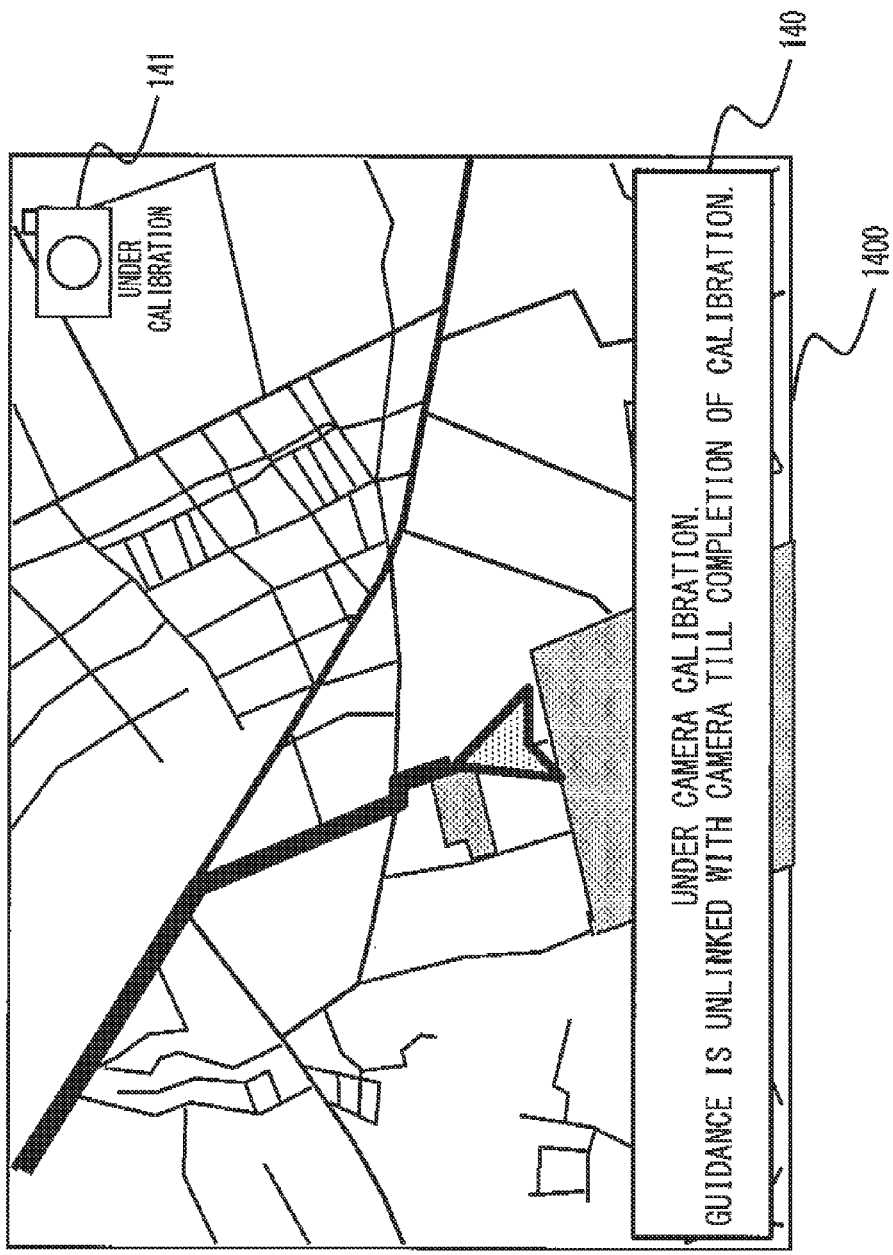
FIG. 14 is a diagram illustrating an example of display outputted on the display unit 50 included in the navigation device of the navigation system.
Figure 15:
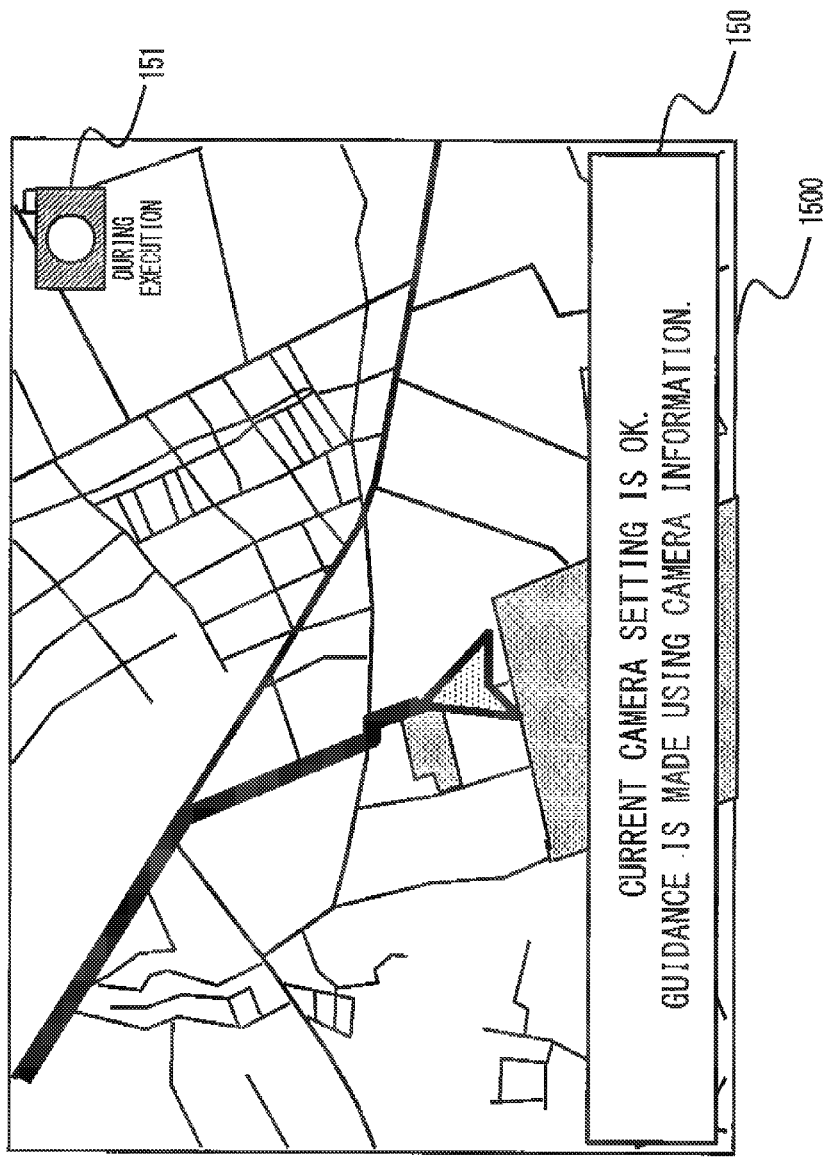
FIG. 15 is a diagram illustrating an example of display outputted on the display unit 50 included in the navigation device of the navigation system.

FIG. 10 is a flowchart of the whole processing at the navigation system including the center device 1 and the navigation device 5. At the navigation system, the camera parameters of the camera 6 are calibrated and guidance to the destination is performed using the image information about the scenery image captured by the camera 6. FIGS. 14 and 15 are diagrams illustrating examples of screen displays at the navigation device 5 to supplementarily explain the processing according to the present embodiment.

At the navigation device 5, the camera 6 is attached to the camera connection unit 55 to connect the camera 6 to the navigation 5 and then the navigation processing starts. The location information acquisition unit 515 acquires OPS signals received by the GPS reception unit and updates the location information related to the current location and the moving direction of the vehicle 4 (step S1110). The image information acquisition unit 516 acquires the image information about the scenery image captured by the camera 6 via the camera connection unit 55. The information provision unit 521 transmits the updated location information and the image information about the scenery image captured by the camera 6 to the center device 1 via the communication control unit 511 and the communication unit 51 to request the camera parameters (step S1111).

The information acquisition unit 12 included in the CPU 100 of the center device 1 receives the request for the camera parameters from the navigation device 5 via the communication interface unit 11 (step S1101). Upon receipt of this request, the camera parameter calibration availability determination unit 13 reads in the map information from the map database 20 based on the location information included in the request for the camera parameters and identifies the location on the map corresponding to the current location of the vehicle 4 by the map matching method (step S1102). For any location on the map identified in step S1102 that is, for instance, a location on the road, the camera parameter calibration availability determination unit 13 refers to the road information about the surrounding roads including the identified road and determines whether or not the calibration of the camera parameters is possible according to the determination processing of camera parameter calibration availability shown in FIG. 2 (step S1103). If the calibration of the camera parameters is impossible (no in step S51103), the camera parameter calibration availability determination unit 13 determines that the calibration of the camera parameters is impossible and causes the information provision unit 15 to transmit a communication indicating that the calibration of the camera parameters is impossible to the navigation device 5 via the communication interface unit 11 (step S1107) to complete the processing at the center device 1.

If the calibration of the camera parameters is possible (yes in step S1103), the camera parameter calibration timing detection unit 14 determines whether or not the calibration of the camera parameters is necessary according to the camera parameter calibration timing detection processing shown in FIG. 3 (step S1104). If the calibration of the camera parameters is unnecessary (no in step S1104), the camera parameter calibration timing detection unit 14 determines that the calibration of the camera parameters is unnecessary. Then, the information provision unit 15 transmits a communication indicating that the calibration of the camera parameters is unnecessary to the navigation device 5 via the communication interface unit 11 (step S1108) to complete the processing at the center device 1. If the calibration of the camera parameters is necessary (yes in step S1104), the camera parameter calibration unit 18 executes the calibration calculation processing for calibrating the camera parameters according to the camera parameter calibration calculation processing shown in FIG. 5 (step S1105). The information provision unit 15 transmits the camera parameters obtained by the camera parameter calibration unit 18 in step S1105 to the navigation device 5 via the communication interface unit 11 (step S1106) to complete the processing at the center device 1.

The information acquisition unit 512 of the navigation device 5 receives information from the center device 1 via the communication unit 51 and the communication control unit 511 (step S1112). For any information received by the information acquisition unit 512 in step S1112 that contains a communication indicating that the calibration of the camera parameters is impossible (yes in step S1113), the information acquisition unit 512 outputs a communication indicating that the calibration of the camera parameters is impossible in a traveling environment at the current location of the vehicle 4 to, for instance, the display unit 50 via the input/output interface unit 519 (step S1120). The route search unit 517 searches a recommended route from the current location of the vehicle 4 to the destination. The route guide information creation unit 522 creates route guidance information for guiding the vehicle 4 to the destination along the searched recommended route based on the route information obtained from the route search unit 517. The route guide unit 518 performs guidance which is unlinked with the camera 6 by using the guide information created by the route guide information creation unit 522 (step S1121), during which the information provision unit 521 requests the camera parameters to the center device 1 via the communication control unit 511 and the communication unit 51 until the calibration of the camera parameters is enabled.

FIG. 14 shows a display example 1400 at the display unit 50 in step S1120. An icon 141 indicates the state of action linked with the camera. A display message 140 displays a message of "UNDER CALIBRATION" until the result of the judgment in step S1114 is obtained, i.e., until the calibration of the camera parameters is executed. Upon receipt of the information indicating that the calibration of the camera parameters is unnecessary in step S1112 (yes in step S1114), the information acquisition unit 512 outputs a message indicating that no updating of the camera parameters is necessary to, for instance, the display unit 50 via the input/output interface unit 519 (step S1121), and executes the processing subsequent to step S1116 by using the camera parameters stored at the camera parameter storage device 513.

FIG. 15 shows an example of display output 1500 at the display unit 50 in step S1121. Upon completion of the calibration of the camera, the icon 141 changes to the icon 151 and the display message 140 switches to the display message 150. For any information containing the camera parameters received in step S1112 (no in step S1114), the information acquisition unit 512 updates the camera parameters stored in the camera parameter storage device 513 to the camera parameters received in step S1112 (step S1115). The image information acquisition unit 516 acquires the image information about the scenery image captured by the camera 6 from the camera connection unit 55 (step S1116). The image processing unit 514 reads out the updated camera parameters from the camera parameter storage device 513 and converts the coordinates of the image information by using the read out updated camera parameters to create a scenery conversion image (step S1117).

The image processing unit 514 calculates an estimated distance to a terrestrial object around the current position of the vehicle 4, for instance, a crossing in the front of the vehicle 4 or a forward vehicle that awaits signal turning into blue at the crossing, based on the scenery conversion image created in step S1117 and on the focal distance of the lens of the camera 6 for recognition. In addition, it recognizes, for instance, a lane on which the vehicle 4 runs (step S1118). The lane on which the vehicle 4 runs is recognized by recognition of the type of lines drawn on the edges of the lane, for instance, solid lines, broken lines, or doublets by image processing. The route search unit 517 searches a recommended route from the current location of the vehicle 4 to the destination. The route guide information creation unit 522 creates route guide information based on the results of recognition of the estimated distance from the current location of the vehicle 4 to a forward crossing or a forward vehicle and of the travel condition concerning the travel lane obtained by the image processing unit 514 in step S1117, based on the searched information of the recommended route searched by the route search unit 517, and based on the scenery conversion image created in step S1117 (step S1119). The route guide information includes information for performing guidance, such as a guidance announcement of lane switching to the crew of the vehicle 4 if the route guide unit 518 determines that lane switching of the travel lane necessary for the vehicle 4 remains to be performed, or a warning for a danger of an approaching to an object detected ahead.

The route guide unit 518 outputs the guidance announcement for lane switching or the warning about the danger to, for instance, the display unit 50 via the input/output interface unit 519 based on the route guide information created in step S1119, and guide the vehicle 4 along the recommended route to the destination (step S1120). This process returns to step S1116 to repeat the processing in each of steps S1116 through S1121 until the vehicle 4 reaches the destination along the recommended route or until an instruction command to end the navigation processing is inputted (step S1121). In case that the camera 6 is detached from the camera connection unit 55 and reattached to it during the guidance, the process starting from the processing in step S1110 is executed to calibrate the camera parameters based on the posture information about the camera 6 in an attached state and the posture information of the vehicle 4.

The center CPU 100 of the center device 1 calculates the camera parameters representing the height h of the mount position of the camera 6 and the orientation (δθ, δφ, δψ) of the camera 6. These camera parameters are calculated to convert the scenery image of a scene including the road on which the vehicle 4 runs, which image is captured by the camera 6 mounted on the vehicle 4, into an image suitable for navigation. The center CPU 100 includes the information acquisition unit 12, the camera parameter calibration availability determination unit 13, the camera parameter calibration timing detection unit 14, and the camera parameter calibration unit 18. The information acquisition unit 12 acquires location information about the current location of the vehicle 4 and also a scenery image from the camera 6 via communication with the terminal device 5. The camera parameter calibration unit 18 acquires road data corresponding to the current location based on the location information and acquires the width of the road, on which the vehicle 4 runs, at the current location from the acquired road data. The camera parameter calibration unit 18 performs calibration calculation of the camera parameters based on the scenery image and the road width information. This enables calibration of the camera parameters by using the conventional road data contained in the conventional map data.

The navigation system, which guides the vehicle 4 to the destination utilizing the image information about the scenery image captured by a detachably attached camera 6, may need frequent calibration of the camera parameters due to change of the posture of the camera 6 as a result of reattachment of the camera 6 or operation or vibration of the camera 6 during the guidance. The center CPU 100 of the center device 1 determines whether or not the calibration of the camera parameters is available based on the ambient environment of the vehicle 4, and performs calibration calculation of the camera parameters if any change of the posture of the camera 6 is detected. This enables the main body unit 52 in the terminal device 5 to perform a guidance of the vehicle 4 to the destination based on the recognition of the ambient environment during the traveling of the vehicle 4, even if the CPU throughput of the main body 52 is not so high.

The information necessary for the calibration of the camera parameters, such as location information and image information, are transmitted from the terminal device 5 to the center device 1, where the calibration calculation of the camera parameters is performed and the camera parameters calculated at the center device 1 are transmitted to the terminal device 5. This enables guidance of the vehicle 4 utilizing the image information about the scenery image captured by the camera 6 with concomitant calibration of influences due to the change of the posture of the camera 6 without the function necessary for calibration calculation of the camera parameters being provided at the terminal device 5. Thus, the calibration calculation of the camera parameters performed at the center device 1 enables the terminal device 5, which has no detailed and updated map necessary for such calibration calculation of the camera parameters, to perform guidance of the vehicle 4 utilizing the image information about the scenery image captured by the camera 6. Specifically, any terminal device having no map, such as a smartphone, used as the terminal device 5 can perform guidance along a recommended route of the vehicle 4 utilizing the image information about the scenery image captured by the camera included in the smartphone.

Variation Examples (1) The flowchart in FIG. 10 corresponds to an aspect in which the process related to the calibration of the camera parameters is performed at the center device 1. To execute the process in steps S1116 through S1119 at the center device 1, the image information about the scenery image acquired in step S1116 may be transmitted by the information provision unit 521 to the center device 1 via the communication control unit 511 and the communication unit 51. The information acquisition unit 512 acquires the results of recognition of the traveling state of the vehicle 4 (for instance, distance from surrounding terrestrial objects and traveling lane of the vehicle 4) and route guide information to the destination obtained at the center device 1. This further simplifies the structure of the terminal device 5 and thus reduces or eliminates the load of processing related to calibration of the camera parameters or image processing upon the main body unit 52 of the terminal device 5, so that the calculation of a route and the guidance to the destination of the vehicle 4, and any other processing can be executed without delays and at appropriate timing. In addition, this eliminates needs for storing, in the map database 520, detailed map information such as shapes of terrestrial objects including road widths, which are necessary for recognizing the terrestrial objects surrounding the vehicle 4, so that the size of the map database 520 can be decreased. The timing of transmission of image information from the terminal device 5 to the center device 1 may be controlled by using the location information and time obtained by the OPS reception unit 54 and traveling speed at the time, for instance, when the vehicle 4 arrives at a predetermined location, for instance, short of a guide point, when a predetermined time set based on, for instance, an estimated time for arrival at a predetermined location or traffic information is updated, or when the vehicle 4 travels at a predetermined speed or faster. This reduces the communication load of the main body unit 52 of the terminal device 5.

Figure 11:
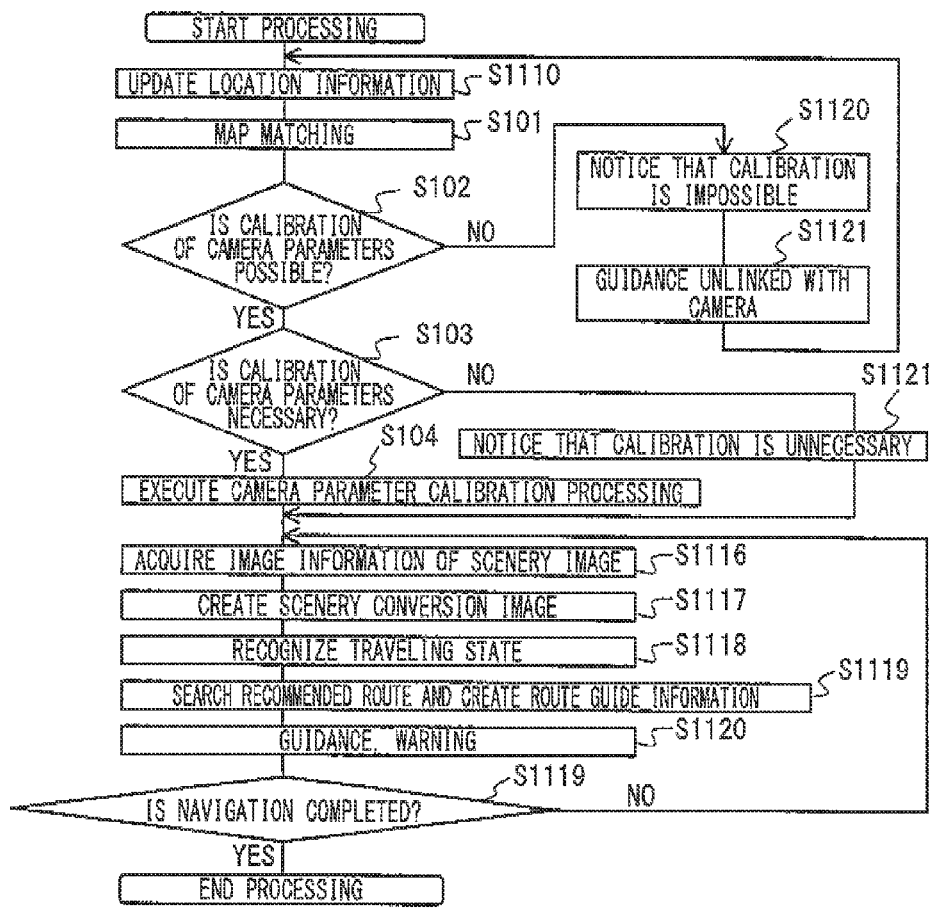
FIG. 11 is a flowchart of the processing executed at the navigation device itself to perform guidance to the destination using image information.

(2) FIG. 11 is a flowchart illustrating the processing in FIG. 10 executed by the navigation device 5 alone without being linked with the center device 1. The processing that corresponds to the processing relating to the camera parameter calibration calculation in steps S1102, S1103, S1104, and S1105 at the center device 1 is executed at the navigation device 5. The location information acquisition unit 515 updates the location information (step S1110) and executes map matching similar to that executed in step S1102 (step S101). The route search unit 517 determines whether or not the camera parameter calibration is available similarly to step S1103 (step S102). If the camera parameter calibration is possible, the route search unit 517 determines whether or not the camera parameter calibration similar to that in step S1104 is necessary (step S103). If the camera calibration is necessary, route search unit 517 performs camera parameter calibration calculation similar to that in step S1105 (step S104). Subsequently, the process in step S1116 through S1121, in which the ambient traveling environment is recognized using the calibrated camera parameters and guidance to the destination in the same manner as described above, is executed.

Figure 12:
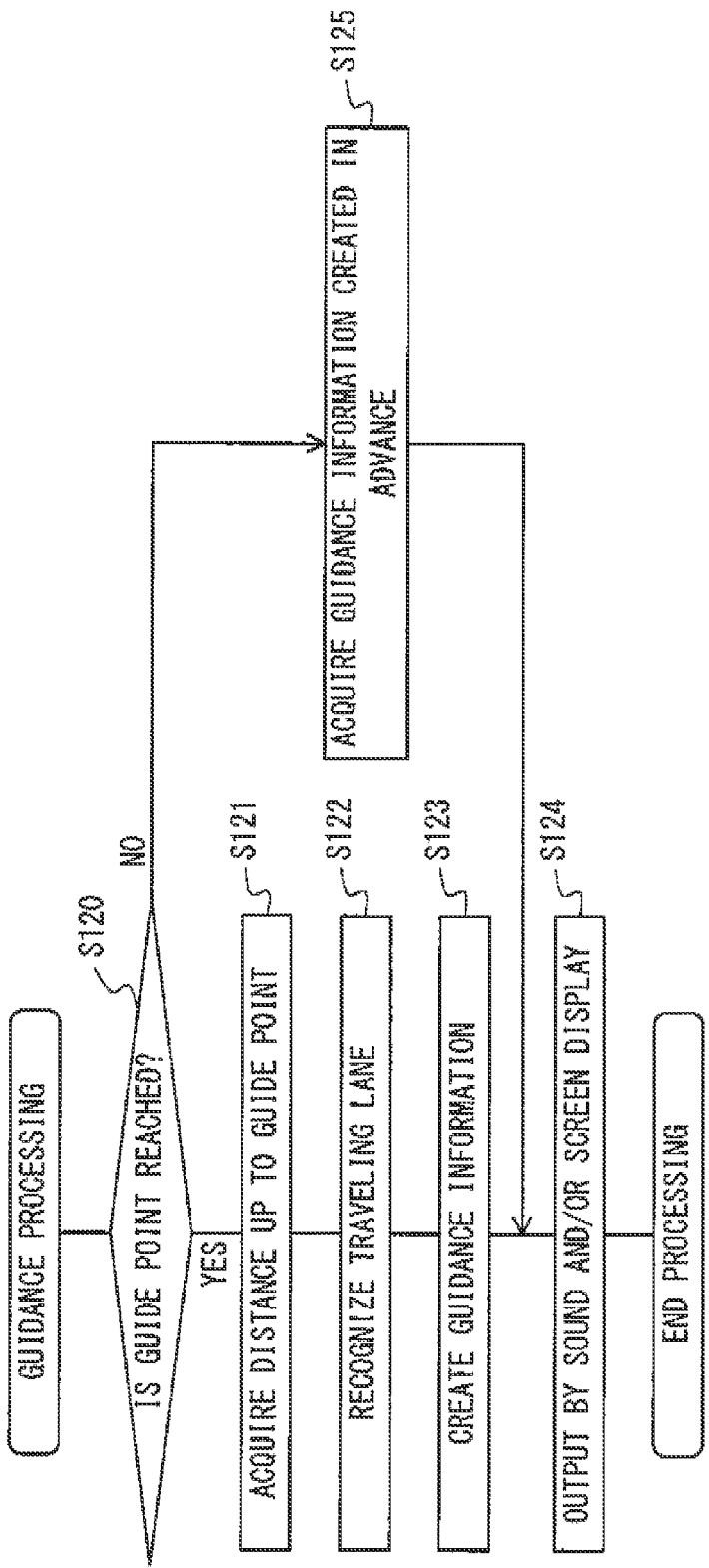
FIG. 12 is a flowchart of an example of the guidance executed in step S1118 by the route guide unit included in the center device of the navigation system.
Figure 13:
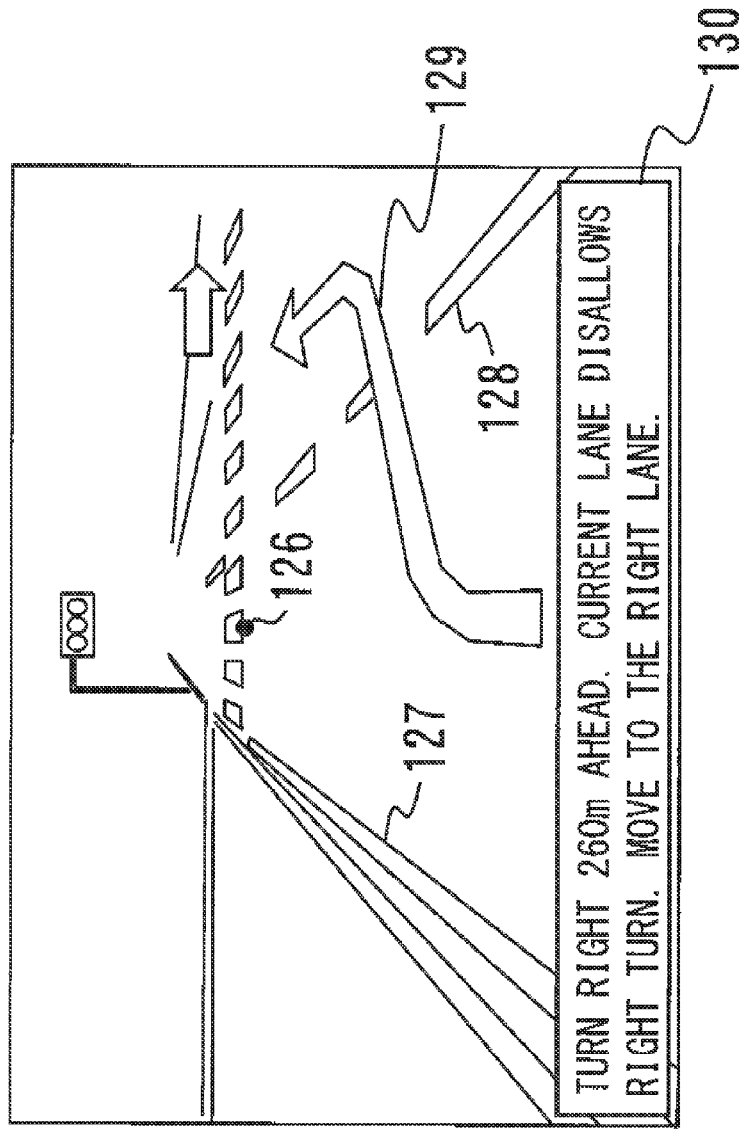
FIG. 13 is a diagram illustrating an example of display outputted on the display unit 50 included in the navigation device of the navigation system.

(3) FIG. 12 is a flowchart illustrating an example of the guidance utilizing the image information executed by the route guide unit 518 in step S1120. FIG. 13 is a flowchart supplementarily illustrating the flowchart in FIG. 12. In step S1120, the vehicle 4 is guided to the destination based on the route guide information, such as a notice of right or left turn point, created by the route guide information creation unit 522 based on the route information calculated by the route search unit 517. The route guide unit 518 acquires the location information obtained by the location information acquisition unit 515 from the GPS reception unit 54 and confirms whether or not the current location of the vehicle 4 is a guide point (step S120). For any current location of the vehicle 4 other than the guide point (no in step S120), the route guide unit 518 acquires any guide information contained in the route guide information created by the route guide information creation unit 522 (step S125), and outputs sound and/or screen display to the operation unit 53 and/or the display unit 50, respectively, via the input/output interface unit 519 (step S124).

For any current location of the vehicle 4 that is a guide point (yes in step S120), the route guide unit 518 acquires estimated distance information about an estimated distance from the vehicle 4 to a surrounding terrestrial object calculated in step S1118, for instance, an estimated distance from the vehicle 4 to the guide point (step S121). For any guide point that is a right or left turn crossing, the route guide unit 518 acquires, for instance, an estimated distance from the vehicle 4 to a pedestrian crosswalk 126 shown in FIG. 13. The route guide unit 518 further identifies the lane on which the vehicle 4 runs by image processing based on the pattern type (straight line) of the line 127 and the pattern type (broken line) of the line 128 drawn on both edges of the lane recognized in step S1118 (step S122). The route guide unit 518 acquires the lane information relating to the lane on which the vehicle 4 runs from the map database 520 and causes the guide information creation unit 522 to create guide information at a guide point of interest based on the direction of right or left turn at the guide point, an estimated distance to the guide point for the vehicle 4, and the traveling lane, and acquires the created guide information (step S123). The route guide unit 518 outputs the guide information to the operation unit 53 and the display unit 50 in the form of sound and/or screen display via the input/output interface unit 519 (step S124).

For instance, for any vehicle 4 that plans to turn right at a forward guide point and travels on a lane not for right turn but for through traffic, the route guide unit 518 causes the guide information creation unit 522 to create an arrow 129 and an announcement 130 that urge moving to a lane for right turn and have these brought on display at the screen of the display unit 50. The arrow 129 and the announcement 130 are displayed so that the estimated time for arrival of the vehicle 4 at the guide point 126 or the estimated distance of the vehicle 4 to the guide point 126 are notified at timing appropriate taking safety and traffic (traveling speed) into consideration.

(4) If a negative decision is made in step S35 in FIG. 3, for any vehicle 4 whose current location is near the guide point, the process may proceed to step S37 to eliminate the camera parameter calibration calculation processing and the transmission of the camera parameters. This reduces the adverse influence on the throughput of the CPU of the main body unit 52 upon guidance at the terminal device 5.

The embodiments and variation examples may be combined with each other in any fashion. The present invention is not limited to the components used in the embodiments described above so far as one or more characteristic features of the present invention are not damaged. Other embodiments conceivable within the technical concept of the present invention may be included in the scope of the present invention.

The disclosure of the following priority application is herein incorporated by reference: Japanese Patent Application No. 2012-172930 (filed on Aug. 3, 2012).

REFERENCE SIGNS LIST 1 center device
2 communication network
3 base station
4 vehicle
5 terminal device (navigation device)
6 camera
11 communication interface unit
12 information acquisition unit
13 camera parameter calibration availability determination unit
14 camera parameter calibration timing determination unit
15 information provision unit
16 image processing unit
17 forward scenery prediction image creation unit
18 camera parameter calibration unit
20 map database
50 display unit
51 communication unit
52 main body unit
53 operation unit
54 OPS reception unit
55 camera connection unit
56 storage unit
100 center CPU
110 storage device
511 communication control unit
512 information acquisition unit
513 camera parameter updating unit
514 image processing unit
515 location information acquisition unit
516 image information acquisition unit
517 route search unit
518 route guide unit
519 input/output interface unit
520 map database
521 information provision unit
522 route guide information creation unit

The invention claimed is:

1. A device for calculating one or more camera parameters, the device comprising:
a camera;
a location information acquisition unit that acquires location information about a current location of the traveling vehicle;
a road width information acquisition unit that acquires road data corresponding to the current location based on the location information and acquires road width information relating to a width of a road on which the traveling vehicle moves at the current location from the road data;
a scenery image acquisition unit that acquires a scenery image from the camera;
a camera parameter calibration unit that performs calibration calculation of the one or more camera parameters based on the scenery image and the road width information, wherein
the device converts the scenery image captured by the camera of a scenery including the road on which the traveling vehicle moves,
the one or more camera parameters that are calculated include a height of a mount position of the camera relative to the road and a direction of the camera; and
displaying on a screen the converted scenery image, wherein
the height of the mount position of the camera is calculated based on a ratio of a road width as displayed on the screen to the width of the road wherein the camera parameter calibration unit performs calibration calculation when a road condition determination unit determines that the road satisfies predetermined road conditions based on each of the following:
i) the width of the road around the current location,
ii) a number of lanes of the road around the current location,
iii) whether a road type of the road around the current location is classified into a narrow street,
iv) a link type of a link related to the road around the current location,
v) an inclination of the road around the current location,
vi) a curvature of the road around the current location, and
vii) a connection angle formed between a link related to the road around the current location and another link connected thereto.

2. The device for calculating one or more camera parameters according to claim 1, further comprising:
a prediction image creation unit that creates a prediction image of the scenery based on the location information and the road data acquired by the road width information acquisition unit and extracts a first feature part included in the prediction image;
a first conversion unit that creates a first scenery conversion image by converting coordinates of the scenery image based on the one or more camera parameters;
a feature extraction unit that extracts a second feature part from the first scenery conversion image by image processing calculation; and
a similarity determination unit that determines whether or not the first feature part acquired by the prediction image creation unit is similar to the second feature part acquired by the feature extraction unit, wherein
if the similarity determination unit determines that the first feature part is dissimilar to the second feature part, the camera parameter calibration unit performs calibration calculation of the one or more camera parameters.

3. The device for calculating one or more camera parameters according to claim 2, further comprising:
a road data acquisition unit that acquires the road data corresponding to the current location; and
the road condition determination unit that determines whether or not the road satisfies predetermined road conditions around the current location based on the road data, wherein
if the road condition determination unit determines that the road satisfies the predetermined road conditions, the camera parameter calibration unit performs calibration calculation of the one or more camera parameters.

4. A navigation system comprising the a device for calculating one or more camera parameters according to claim 1;
a camera connection unit to which the camera is operable to be attached for connection to enable the scenery image captured by the camera to be acquired by the scenery image acquisition unit; and a second conversion unit that creates a second scenery conversion image by conversion of coordinates of the scenery image based on the one or more camera parameters obtained by calibration calculation by the camera parameter calibration unit.

5. The navigation system according to claim 4, further comprising:

a route search unit that searches a recommended route from the current location to a destination;

a route guide information creation unit that creates route guide information for guiding the traveling vehicle to the destination along the recommended route based on the recommended route and the second scenery conversion image using the second scenery conversion image; and a route guide unit that guides the traveling vehicle along the recommended route to the destination based on the route guide information created by the route guide information creation unit.

6. The navigation system according to claim 5, further comprising:

a moving body state recognition unit that calculates an estimated distance from the current location to a crossing on the road around the current location or to another traveling vehicle in front of the traveling vehicle based on the second scenery conversion image, a focal distance of the camera, and the one or more camera parameters subjected to calibration calculation by the camera parameter calibration unit and that recognizes a moving state of the traveling vehicle by recognizing a lane, which is included in the scenery image and on which the moving body moves, based on a type of a line drawn on each of both edges of the lane by image processing, wherein the route guide information creation unit creates the route guide information based on the estimated distance and the lane recognized by the moving state recognition unit and based on the second scenery conversion image.

7. The device for calculating one or more camera parameters according to claim 1, wherein the one or more camera parameters also include a yaw angle, pitch angle and roll angle corresponding to rotation angles that make an angle of image capturing identical to a posture of the vehicle by rotational motion.

8. A method of calculating one or more camera parameters, the method comprising:

mounting a camera on a vehicle;

acquiring location information about a current location of the vehicle;

acquiring road data corresponding to the current location based on the location information;

acquiring road width information about a road width of a road on which the vehicle moves at the current location;

acquiring a scenery image from the camera;

executing calibration calculation of the one or more camera parameters based on the scenery image and the road width information;

converting the scenery image captured by the camera of a scenery including the road on which the vehicle moves into a navigation image;

calculating at least a height of a mount position of the camera relative to the road and a direction of the camera; and displaying on a screen the converted scenery image, wherein the height of the mount position of the camera is calculated based on a ratio of a road width as displayed on the screen to the road width wherein the executing calibration calculation occurs when the road satisfies predetermined road conditions based on each of the following:

i) the width of the road around the current location, ii) a number of lanes of the road around the current location, iii) whether a road type of the road around the current location is classified into a narrow street, iv) a link type of a link related to the road around the current location, v) an inclination of the road around the current location, vi) a curvature of the road around the current location, and vii) a connection angle formed between a link related to the road around the current location and another link connected thereto.

9. The method according to claim 8, further comprising: calculating a yaw angle, pitch angle and roll angle corresponding to the rotation angles that make the angle of image capturing identical to the posture of the traveling vehicle by rotational motion.

10. A system for calculating one or more camera parameters, the system comprising:

a vehicle;

a camera that is mounted on the vehicle;

a location information acquisition unit that acquires location information about a current location of the vehicle;

a road width information acquisition unit that acquires road data corresponding to the current location based on the location information and acquires road width information relating to a width of a road on which the vehicle moves at the current location from the road data;

a scenery image acquisition unit that acquires a scenery image from the camera;

a camera parameter calibration unit that performs calibration calculation of the one or more camera parameters based on the scenery image and the road width information, wherein the device converts the scenery image captured by the camera of a scenery including the road on which the vehicle moves into a displayable image, the one or more camera parameters that are calculated include a height of a mount position of the camera relative to the road and a direction of the camera, and wherein the camera parameter calibration unit performs calibration calculation when a road condition determination unit determines predetermined road conditions based on each of the following:

i) the width of the road around the current location, ii) a number of lanes of the road around the current location, iii) whether a road type of the road around the current location is classified into a narrow street, iv) a link type of a link related to the road around the current location, v) an inclination of the road around the current location, vi) a curvature of the road around the current location, and
vii) a connection angle formed between a link related to the road around the current location and another link connected thereto; and a screen that displays the converted scenery image.

\* \* \* \* \*